United States Patent
Sharma et al.

(10) Patent No.: US 9,751,694 B2
(45) Date of Patent: *Sep. 5, 2017

(54) SIDE-FLEXING CONVEYORS

(71) Applicant: Solus Industrial Innovations, LLC, Florence, KY (US)

(72) Inventors: Apaar Sharma, Chattisgarh (IN); Shivakumar Chougule, Maharashtra (IN)

(73) Assignee: Solus Industrial Innovations, LLC, Florence, KY (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/092,155

(22) Filed: Nov. 27, 2013

(65) Prior Publication Data

US 2014/0231226 A1 Aug. 21, 2014

(30) Foreign Application Priority Data

Nov. 29, 2012 (IN) .......................... 3396/MUM/2012

(51) Int. Cl.
*B65G 17/06* (2006.01)
*B65G 15/30* (2006.01)
*B65G 17/08* (2006.01)

(52) U.S. Cl.
CPC ........... *B65G 15/30* (2013.01); *B65G 17/086* (2013.01); *B65G 2207/30* (2013.01)

(58) Field of Classification Search
CPC .............................. B65G 15/02; B65G 17/086
USPC ................................. 198/850, 851, 853, 831
See application file for complete search history.

(56) References Cited

U.S. PATENT DOCUMENTS

| | | | |
|---|---|---|---|
| 1,996,586 | A | 4/1935 | Meyer |
| 2,234,537 | A | 3/1941 | Blackburn |
| 2,906,395 | A | 9/1959 | Greer |
| 3,467,239 | A | 9/1969 | Roinestad |
| 3,584,731 | A | 6/1971 | Dahiem |
| 3,651,924 | A | 3/1972 | Homeier et al. |

(Continued)

FOREIGN PATENT DOCUMENTS

| | | |
|---|---|---|
| CA | 2566004 A1 | 11/2005 |
| DE | 202008008337 U1 | 8/2008 |

(Continued)

OTHER PUBLICATIONS

Re-Examination Application No. 95/000,071, Filed Jan. 26, 2005, Guldenfels.

(Continued)

*Primary Examiner* — William R Harp
(74) *Attorney, Agent, or Firm* — Knobbe, Martens, Olson & Bear, LLP

(57) ABSTRACT

A conveyor including a side-flexing belt having a plurality of modules and a plurality of rods. Each module includes a central portion having a main region extending in a straight path, a plurality of front links each including a front aperture, a plurality of rear links each including a rear aperture, a plurality of front gaps between adjacent pairs of front links, and a plurality of rear gaps between adjacent pairs of rear links. A length of each front gap is substantially the same along substantially the entire thickness of an adjacent front link, and a length of each rear gap is substantially the same along the entire thickness of an adjacent rear link.

31 Claims, 25 Drawing Sheets

(56) References Cited

U.S. PATENT DOCUMENTS

| | | |
|---|---|---|
| 3,685,367 A | 8/1972 | Dawson |
| 3,693,780 A | 9/1972 | Fraioli, Sr. |
| 3,854,575 A | 12/1974 | Fraioli, Sr. |
| 3,946,857 A | 3/1976 | Fraioli, Sr. |
| 4,037,713 A | 7/1977 | Soliman et al. |
| 4,089,406 A | 5/1978 | Teske et al. |
| 4,153,152 A | 5/1979 | Lapeyre |
| 4,222,483 A | 9/1980 | Wootton et al. |
| 4,280,620 A | 7/1981 | Baker, Jr. |
| 4,645,070 A | 2/1987 | Homeier |
| 4,645,476 A | 2/1987 | King et al. |
| 4,742,907 A | 5/1988 | Palmaer |
| 4,865,184 A | 9/1989 | Wechner |
| 4,867,301 A | 9/1989 | Roinestad et al. |
| 4,893,710 A | 1/1990 | Bailey et al. |
| 4,901,844 A | 2/1990 | Palmaer et al. |
| 4,919,252 A | 4/1990 | Wechner |
| 4,934,517 A | 6/1990 | Lapeyre |
| 4,940,133 A | 7/1990 | Roinestad et al. |
| 4,949,838 A | 8/1990 | Lapeyre et al. |
| 4,951,807 A | 8/1990 | Roinestad et al. |
| 4,953,693 A | 9/1990 | Draebel |
| 4,957,597 A | 9/1990 | Irwin |
| 4,972,942 A | 11/1990 | Faulkner |
| 5,004,097 A | 4/1991 | Roinestad et al. |
| 5,031,757 A | 7/1991 | Draebel et al. |
| 5,070,999 A | 12/1991 | Layne et al. |
| 5,072,826 A | 12/1991 | Wechner |
| 5,105,938 A | 4/1992 | Tan |
| 5,125,504 A | 6/1992 | Corlett et al. |
| 5,127,515 A | 7/1992 | Damkjaer |
| 5,131,526 A | 7/1992 | Kaak |
| 5,139,135 A | 8/1992 | Irwin et al. |
| 5,141,099 A | 8/1992 | Baumgartner |
| 5,141,102 A | 8/1992 | Roinestad et al. |
| 5,174,439 A | 12/1992 | Spangler et al. |
| 5,176,247 A | 1/1993 | Counter et al. |
| 5,181,601 A | 1/1993 | Palmaer et al. |
| 5,197,591 A | 3/1993 | Roinestad et al. |
| 5,217,110 A | 6/1993 | Spangler et al. |
| 5,224,583 A | 7/1993 | Palmaer et al. |
| 5,224,587 A * | 7/1993 | Robertson ............ B65G 17/086 198/831 |
| 5,253,749 A | 10/1993 | Ensch |
| 5,271,491 A | 12/1993 | Irwin |
| 5,303,817 A | 4/1994 | Kissee |
| 5,303,818 A | 4/1994 | Gruettner et al. |
| 5,307,923 A | 5/1994 | Damkjaer |
| 5,310,046 A | 5/1994 | Palmaer et al. |
| 5,318,169 A | 6/1994 | Faulkner et al. |
| 5,330,046 A | 7/1994 | Yuzawa et al. |
| 5,335,768 A | 8/1994 | Schladweiler |
| 5,346,059 A | 9/1994 | Irwin |
| 5,358,096 A | 10/1994 | Faulkner et al. |
| 5,372,248 A | 12/1994 | Horton |
| 5,375,697 A | 12/1994 | Battati et al. |
| 5,379,883 A | 1/1995 | Damkjaer |
| 5,402,877 A | 4/1995 | Thiele et al. |
| 5,419,428 A | 5/1995 | Palmaer et al. |
| 5,429,227 A | 7/1995 | Krossmann et al. |
| 5,431,275 A | 7/1995 | Faulkner |
| 5,469,958 A | 11/1995 | Gruettner et al. |
| 5,489,020 A | 2/1996 | Clopton |
| 5,501,319 A | 3/1996 | Larson et al. |
| 5,547,071 A | 8/1996 | Palmaer et al. |
| 5,558,204 A | 9/1996 | Daringer |
| 5,562,200 A | 10/1996 | Daringer |
| 5,566,817 A | 10/1996 | Meeker |
| 5,573,105 A | 11/1996 | Palmaer |
| 5,573,106 A | 11/1996 | Stebnicki |
| 5,598,916 A | 2/1997 | Horton et al. |
| 5,613,597 A | 3/1997 | Palmaer et al. |
| 5,622,252 A | 4/1997 | Raum |
| 5,645,160 A | 7/1997 | Palmaer et al. |
| 5,662,211 A | 9/1997 | Quentin |
| 5,690,210 A | 11/1997 | Layne |
| 5,697,492 A | 12/1997 | Damkjaer |
| 5,738,205 A | 4/1998 | Draebel |
| 5,775,480 A | 7/1998 | Lapeyre et al. |
| 5,779,027 A | 7/1998 | Ensch et al. |
| 5,782,340 A | 7/1998 | Dolan |
| 5,791,455 A | 8/1998 | Clopton |
| 5,797,820 A | 8/1998 | Endo |
| 5,816,390 A | 10/1998 | Stebnicki |
| 5,826,705 A | 10/1998 | Ramsey et al. |
| 5,881,863 A | 3/1999 | Borner |
| 5,904,241 A | 5/1999 | Verdigets et al. |
| 5,906,270 A | 5/1999 | Faulkner |
| 5,921,379 A | 7/1999 | Horton |
| 5,927,479 A | 7/1999 | Merten et al. |
| 5,947,265 A | 9/1999 | Merten et al. |
| 5,954,187 A | 9/1999 | Hager |
| 5,960,937 A | 10/1999 | Stebnicki et al. |
| 5,966,923 A | 10/1999 | Nakamura |
| 6,006,898 A | 12/1999 | Odink |
| 6,036,001 A | 3/2000 | Stebnicki et al. |
| 6,036,002 A | 3/2000 | Kobayashi et al. |
| 6,041,917 A | 3/2000 | Layne |
| 6,050,397 A | 4/2000 | Kato et al. |
| 6,073,756 A | 6/2000 | Damkjaer et al. |
| 6,079,543 A | 6/2000 | Palmaer |
| 6,079,552 A | 6/2000 | Reichert et al. |
| 6,125,995 A | 10/2000 | Layne et al. |
| 6,129,202 A | 10/2000 | Layne et al. |
| 6,142,294 A | 11/2000 | Kobayashi et al. |
| 6,142,295 A | 11/2000 | Greve |
| 6,196,379 B1 | 3/2001 | Van Esch et al. |
| 6,196,381 B1 | 3/2001 | Kato et al. |
| 6,202,834 B1 | 3/2001 | Layne et al. |
| 6,209,716 B1 | 4/2001 | Bogle et al. |
| 6,213,292 B1 | 4/2001 | Takahashi et al. |
| 6,216,854 B1 | 4/2001 | Damkjaer et al. |
| 6,223,889 B1 | 5/2001 | Layne et al. |
| 6,253,911 B1 | 7/2001 | Layne et al. |
| 6,298,982 B1 | 10/2001 | Layne et al. |
| 6,305,530 B1 | 10/2001 | Guldenfels |
| 6,330,941 B1 | 12/2001 | Guldenfels |
| 6,345,715 B2 | 2/2002 | Palmaer |
| 6,357,581 B1 | 3/2002 | Guldenfels |
| 6,360,882 B1 | 3/2002 | Maine, Jr. et al. |
| 6,364,094 B1 | 4/2002 | Alstmar |
| 6,364,095 B1 | 4/2002 | Layne et al. |
| 6,371,284 B1 | 4/2002 | Pasch |
| 6,382,404 B1 | 5/2002 | Guldenfels |
| 6,382,405 B1 | 5/2002 | Palmaer |
| 6,386,355 B1 | 5/2002 | Willems |
| 6,390,285 B2 | 5/2002 | De Geus et al. |
| 6,401,914 B1 | 6/2002 | Greve |
| 6,425,479 B1 | 7/2002 | Guldenfels et al. |
| 6,439,378 B1 | 8/2002 | MacLachlan |
| 6,471,046 B2 | 10/2002 | Layne et al. |
| 6,471,048 B1 | 10/2002 | Thompson, Jr. et al. |
| 6,474,464 B1 | 11/2002 | Horton et al. |
| 6,484,379 B2 | 11/2002 | Palmaer |
| 6,491,152 B1 | 12/2002 | Evers, Jr. et al. |
| 6,516,944 B2 | 2/2003 | Guldenfels |
| 6,523,680 B2 | 2/2003 | Guldenfels |
| 6,578,704 B1 | 6/2003 | MacLachlan |
| 6,581,758 B1 | 6/2003 | van-Zijderveld et al. |
| 6,585,110 B2 | 7/2003 | Layne et al. |
| 6,591,967 B1 | 7/2003 | Doudement et al. |
| 6,615,979 B2 | 9/2003 | Etherington et al. |
| 6,644,466 B2 | 11/2003 | Knott et al. |
| 6,662,938 B2 | 12/2003 | Damkjaer |
| 6,672,451 B1 | 1/2004 | Thompson, Jr. et al. |
| 6,705,460 B2 | 3/2004 | Weiser et al. |
| 6,705,461 B2 | 3/2004 | Kuharevicz et al. |
| 6,758,776 B2 | 7/2004 | Fye et al. |
| 6,766,899 B1 | 7/2004 | Guldenfels |
| 6,779,652 B2 | 8/2004 | Baier et al. |
| 6,793,069 B2 | 9/2004 | Guldenfels |
| RE38,607 E | 10/2004 | Guldenfels et al. |
| 6,827,204 B2 | 12/2004 | Cribiu' |
| 6,837,367 B1 | 1/2005 | Klein et al. |

(56) References Cited

U.S. PATENT DOCUMENTS

| | | |
|---|---|---|
| 6,874,617 B1 | 4/2005 | Layne |
| 6,880,696 B2 | 4/2005 | Cediel et al. |
| 6,896,126 B2 | 5/2005 | Guldenfels |
| 6,910,572 B2 | 6/2005 | Shibayama et al. |
| 6,918,486 B2 | 7/2005 | Shibayama et al. |
| 6,948,613 B2 | 9/2005 | Guldenfels et al. |
| 7,051,870 B2 | 5/2006 | Schoendienst et al. |
| 7,070,043 B1 | 7/2006 | MacLachlan et al. |
| 7,073,662 B2 | 7/2006 | Neely et al. |
| 7,080,729 B2 | 7/2006 | Guldenfels et al. |
| 7,108,126 B2 | 9/2006 | Layne et al. |
| 7,108,127 B2 | 9/2006 | Krisl |
| 7,147,099 B2 | 12/2006 | Guernsey et al. |
| 7,159,709 B2 | 1/2007 | Petrovic |
| 7,168,557 B2 | 1/2007 | Mitchell et al. |
| 7,228,959 B1 | 6/2007 | Harrison |
| 7,234,589 B2 | 6/2007 | Sedlacek |
| 7,244,205 B2 | 7/2007 | Kanaris |
| 7,252,192 B2 | 8/2007 | Stebnicki et al. |
| 7,267,222 B2 | 9/2007 | Montemartini et al. |
| 7,281,626 B2 | 10/2007 | Guldenfels |
| 7,284,657 B2 | 10/2007 | Ulsh et al. |
| 7,293,644 B2 | 11/2007 | Stebnicki et al. |
| 7,314,132 B2 | 1/2008 | Layne et al. |
| 7,331,447 B2 | 2/2008 | Krisl et al. |
| 7,364,036 B2 | 4/2008 | Schoepf |
| 7,367,448 B2 | 5/2008 | Fandella |
| 7,410,047 B2 | 8/2008 | van Faassen |
| 7,419,051 B2 | 9/2008 | Damkjaer |
| 7,438,179 B2 | 10/2008 | Gundlach |
| 7,441,649 B2 | 10/2008 | Layne et al. |
| 7,494,005 B2 | 2/2009 | Messick, Jr. et al. |
| 7,494,006 B2 | 2/2009 | Knott et al. |
| 7,530,454 B2 | 5/2009 | Neely et al. |
| 7,556,143 B2 | 7/2009 | Crooks |
| 7,556,145 B2 | 7/2009 | Elsner |
| 7,559,421 B1 | 7/2009 | McDaniel et al. |
| 7,559,422 B2 | 7/2009 | Layne et al. |
| 7,600,632 B2 | 10/2009 | Hall |
| 7,600,633 B2 | 10/2009 | Rathbun et al. |
| 7,604,111 B2 | 10/2009 | Zmaj |
| 7,624,858 B2 | 12/2009 | Delair et al. |
| 7,635,060 B2 | 12/2009 | Lagneaux |
| 7,661,524 B2 | 2/2010 | Damkjaer |
| 7,690,501 B2 | 4/2010 | Menke et al. |
| 7,699,160 B2 | 4/2010 | Marsetti |
| 7,753,193 B2 | 7/2010 | Kanaris |
| 7,766,159 B2 | 8/2010 | Krisl |
| 7,802,675 B2 | 9/2010 | Hall |
| 7,828,136 B2 | 11/2010 | Damkjaer |
| 7,837,028 B2 | 11/2010 | Elsner |
| 7,837,029 B2 | 11/2010 | Russell |
| 7,841,462 B2 | 11/2010 | Layne et al. |
| 7,850,001 B2 | 12/2010 | Krisl |
| 7,854,315 B2 | 12/2010 | Stebnicki et al. |
| 7,967,132 B2 | 6/2011 | Menke et al. |
| 7,975,840 B2 | 7/2011 | Messick, Jr. et al. |
| 7,987,974 B2 | 8/2011 | Montgomery et al. |
| 8,002,109 B2 | 8/2011 | Rogers et al. |
| 8,047,356 B2 | 11/2011 | Elsner |
| 8,083,053 B2 | 12/2011 | Paardekooper et al. |
| 8,113,340 B1 | 2/2012 | Smith et al. |
| 9,085,414 B2 | 7/2015 | Sharma et al. |
| 2001/0050214 A1 | 12/2001 | Guldenfels |
| 2002/0117382 A1 | 8/2002 | Maine, Jr. |
| 2002/0175056 A1 | 11/2002 | Damkjar |
| 2002/0179417 A1 | 12/2002 | Cediel et al. |
| 2002/0195321 A1 | 12/2002 | Guldenfels |
| 2003/0057061 A1 | 3/2003 | Guldenfels |
| 2003/0192777 A1 | 10/2003 | Guldenfels |
| 2004/0045795 A1 | 3/2004 | Guldenfels |
| 2004/0112720 A1 | 6/2004 | Guldenfels et al. |
| 2004/0140182 A1 | 7/2004 | Morris |
| 2005/0109589 A1 | 5/2005 | Guldenfels |
| 2005/0241922 A1 | 11/2005 | Petrovic |
| 2006/0237290 A1 | 10/2006 | Guldenfels et al. |
| 2006/0249359 A1 | 11/2006 | Pasch |
| 2006/0266627 A1 | 11/2006 | Krisl |
| 2007/0175736 A1 | 8/2007 | Bickel, Jr. et al. |
| 2008/0011587 A1 | 1/2008 | Stebnicki et al. |
| 2008/0023304 A1 | 1/2008 | Elsner |
| 2008/0083598 A1 | 4/2008 | Guldenfels |
| 2008/0210528 A1 | 9/2008 | Menke et al. |
| 2009/0014290 A1 | 1/2009 | Jansen et al. |
| 2009/0057108 A1 | 3/2009 | Paardekooper et al. |
| 2009/0266682 A1 | 10/2009 | Elsner |
| 2009/0277758 A1 | 11/2009 | Marshall |
| 2009/0308716 A1 | 12/2009 | Marsetti |
| 2010/0065405 A1 | 3/2010 | Lagneaux |
| 2010/0175969 A1 | 7/2010 | Marsetti |
| 2010/0236901 A1 | 9/2010 | Marshall |
| 2010/0282577 A1 | 11/2010 | Rettore et al. |
| 2011/0017576 A1 | 1/2011 | Andersen |
| 2011/0094856 A1 | 4/2011 | Guldenfels et al. |
| 2011/0100784 A1 | 5/2011 | Prakasam et al. |
| 2011/0226593 A1 | 9/2011 | Hall et al. |
| 2011/0278136 A1 | 11/2011 | Weiser et al. |
| 2012/0037480 A1 | 2/2012 | Meulenkamp et al. |
| 2012/0125742 A1 | 5/2012 | Corley et al. |
| 2014/0231227 A1 | 8/2014 | Sharma et al. |

FOREIGN PATENT DOCUMENTS

| | | |
|---|---|---|
| EP | 1260459 A1 | 11/2002 |
| FR | 2846642 A1 | 5/2004 |
| JP | 03-714873 B2 | 9/2005 |
| JP | 03-798318 B2 | 7/2006 |
| SE | 211992 | 11/1966 |
| WO | WO 2004/041685 A2 | 5/2004 |
| WO | WO 2012/074389 A1 | 6/2012 |
| WO | WO 2014/085688 A2 | 6/2014 |

OTHER PUBLICATIONS

International Search Report and Written Opinion in related International Patent Application No. PCT/US2013/072377, mailed Apr. 18, 2014, in 14 pages.
2256 Series 1" pitch side flexing belt for material handling/logistics purposes, Jun. 2010, 4 pages.
Partial Search Report in related European Patent Application No. 13859583.0, dated Jul. 7, 2016, in 8 pages.
International Preliminary Report on Patentability in related International Patent Application No. PCT/US2013/072377, mailed Jun. 11, 2015 in 8 pages.
Extended Search Report in related European Patent Application No. 13859583.0, Nov. 30, 2016, in 15 pages.

* cited by examiner

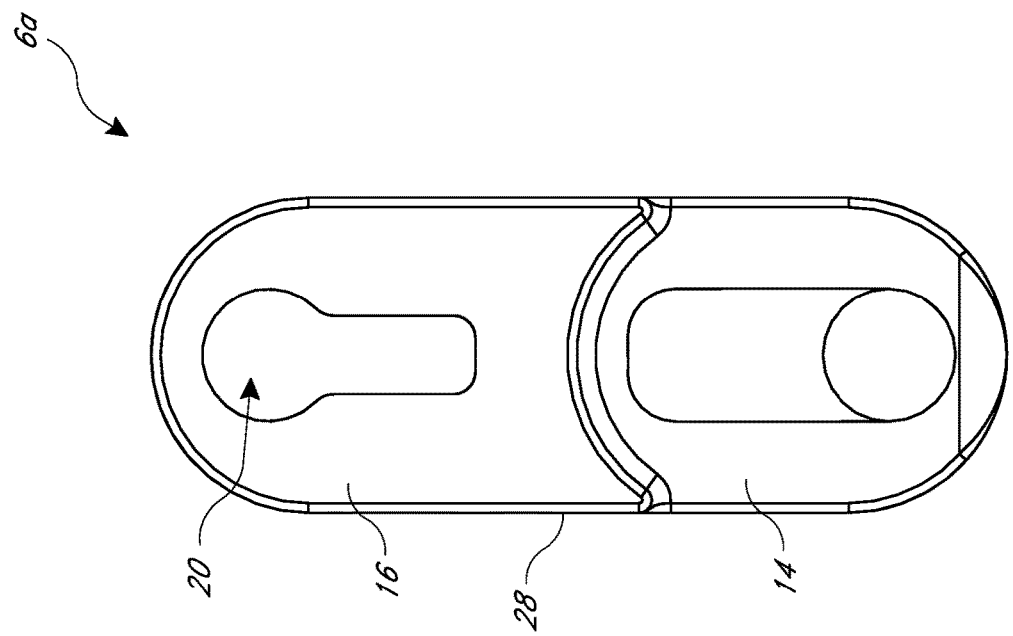
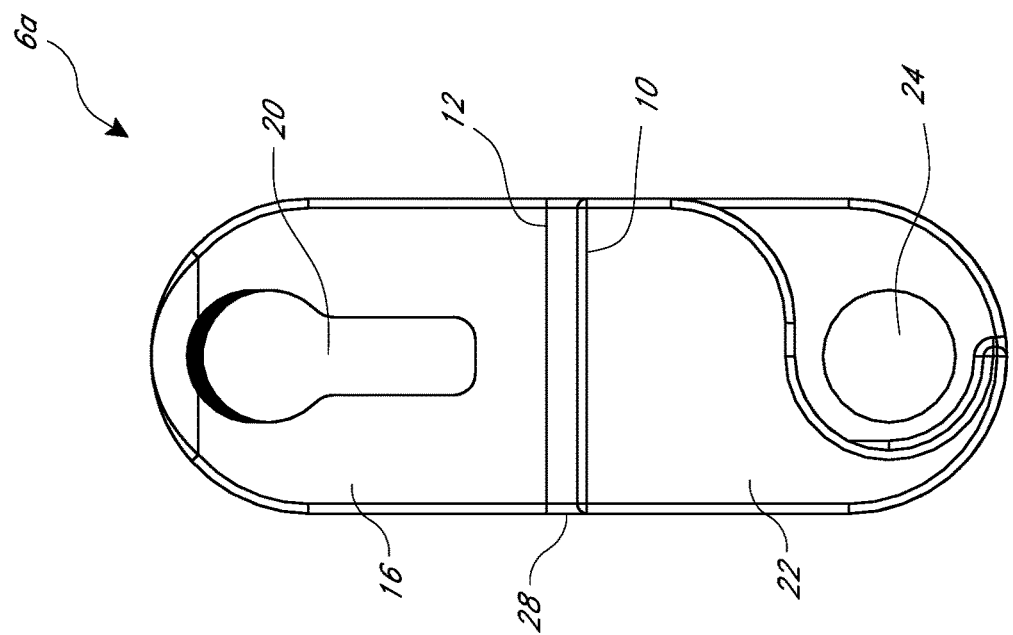

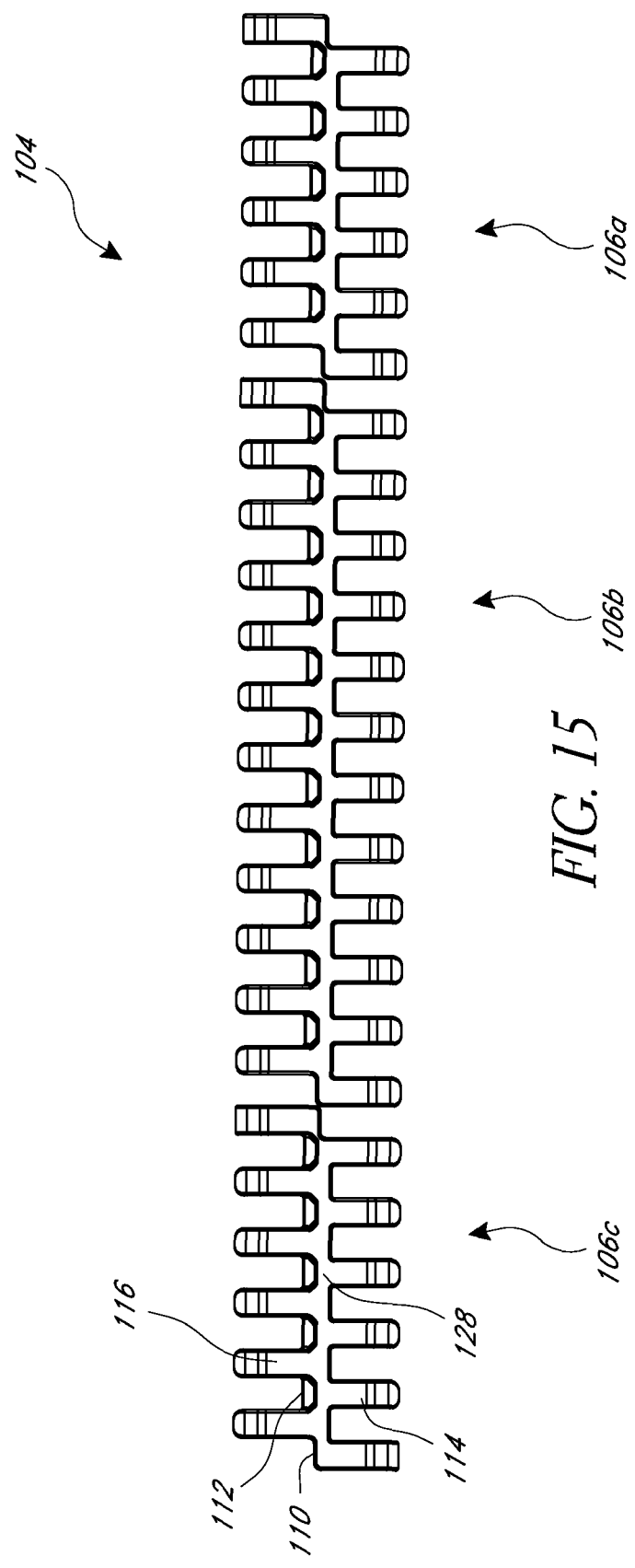

SIDE-FLEXING CONVEYORS

CROSS REFERENCE TO RELATED APPLICATIONS

All applications for which a foreign or domestic priority claim is identified in the Application Data Sheet as filed with the present application are hereby incorporated by reference herein under 37 C.F.R. §1.57.

The present application claims the priority benefit under at least 35 U.S.C. §119 of Indian Patent Application No. 3396/MUM/2012, filed Nov. 29, 2012, the entirety of which is hereby incorporated by reference herein.

BACKGROUND

Field

The present disclosure generally relates to conveyors for moving items, and specifically to conveyors capable of flexing in one or more lateral directions.

Description of the Related Art

Conveyors can be used to convey products along a track from one location to one or more other locations. Some conveyors are configured to flex in one or more lateral directions to change the direction of travel of products moving on the conveyors. Some of these conveyors comprise belts or chains on which products are disposed. The conveyors can be moved with a drive mechanism comprising one or more sprockets and motors.

BRIEF DESCRIPTION OF THE DRAWINGS

FIG. 8B illustrates an end of the end module shown in FIG. 8A.

FIG. 8C illustrates another end of the end module shown in FIG. 8A.

FIG. 15 illustrates a plan view of the module row shown in FIG. 14.

DETAILED DESCRIPTION

Figure 1:
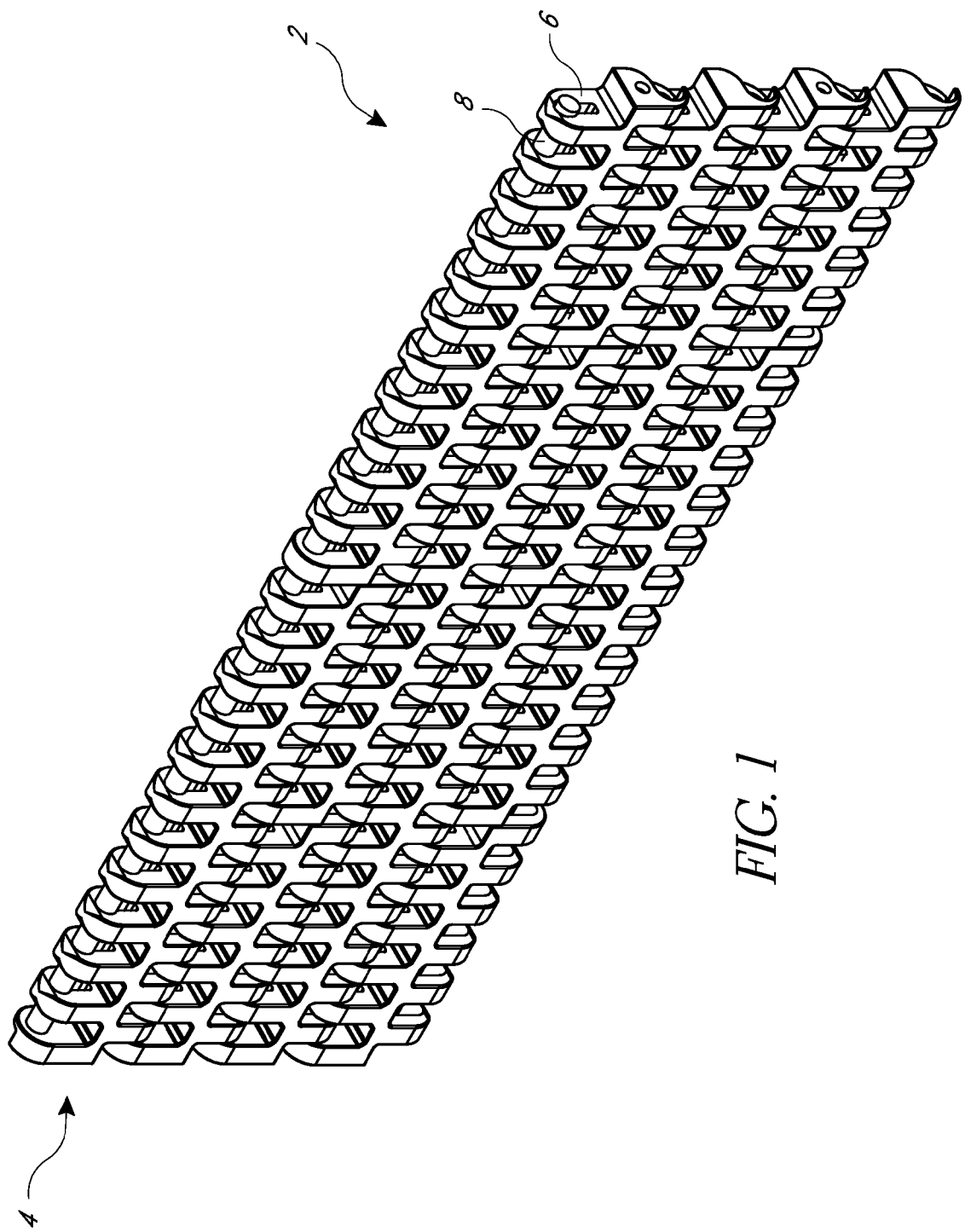
FIG. 1 illustrates a perspective view of a portion of a side-flexing conveyor in a straight configuration.

The conveyor systems described herein illustrate various examples that may be employed to achieve one or more advantages. These examples are only illustrative and not intended in any way to restrict the general disclosure presented and the various aspects and features of the disclosure. Not all embodiments will achieve advantages described herein. Furthermore, the phraseology and terminology used herein is for the purpose of description and should not be regarded as limiting. No features, structure, or step disclosed herein is essential or indispensable.

Conveyor systems generally include a track and a conveyor movable along the track. In some embodiments, the conveyor comprises a belt or a chain. The shape, pathway, and/or direction of the track can vary depending on available floor space or desired processes to be performed on the products, and the desired end location for the products being conveyed. For example, the track can include both straight sections and curved sections. In some embodiments, the conveyor is capable of running in both straight sections and in curved sections by flexing laterally when necessary to follow curves.

Some flexing conveyors have low conveyor strength and are prone to wear out more quickly than conveyors that are configured for running on straight tracks only. These problems can increase as the turning radius of the track decreases. Accordingly, in some embodiments, it can be desirable to provide increased conveyor strength when the conveyor flexes. It can also be desirable to reduce the total amount of conveyor material to reduce the cost to manufacture the conveyor and the amount of energy required to move the conveyor.

FIGS. 1-4 illustrate a side-flexing conveyor 2. The side-flexing conveyor 2 can include one or more modules 6 connected together by rods 8. Each rod 8 joins at least two module rows 4 to increase the length of the conveyor 2, and each module row 4 can include one or more modules 6 depending on the desired width of the conveyor 2. The modules 6 can be the same or different depending on the position of the module. Mechanisms for joining the rod 8 to the module 6 are described in U.S. Pat. No. 7,699,160 and U.S. Pub. No. 2009/0308716, the entire contents of both references are hereby incorporated by reference.

Figure 2:
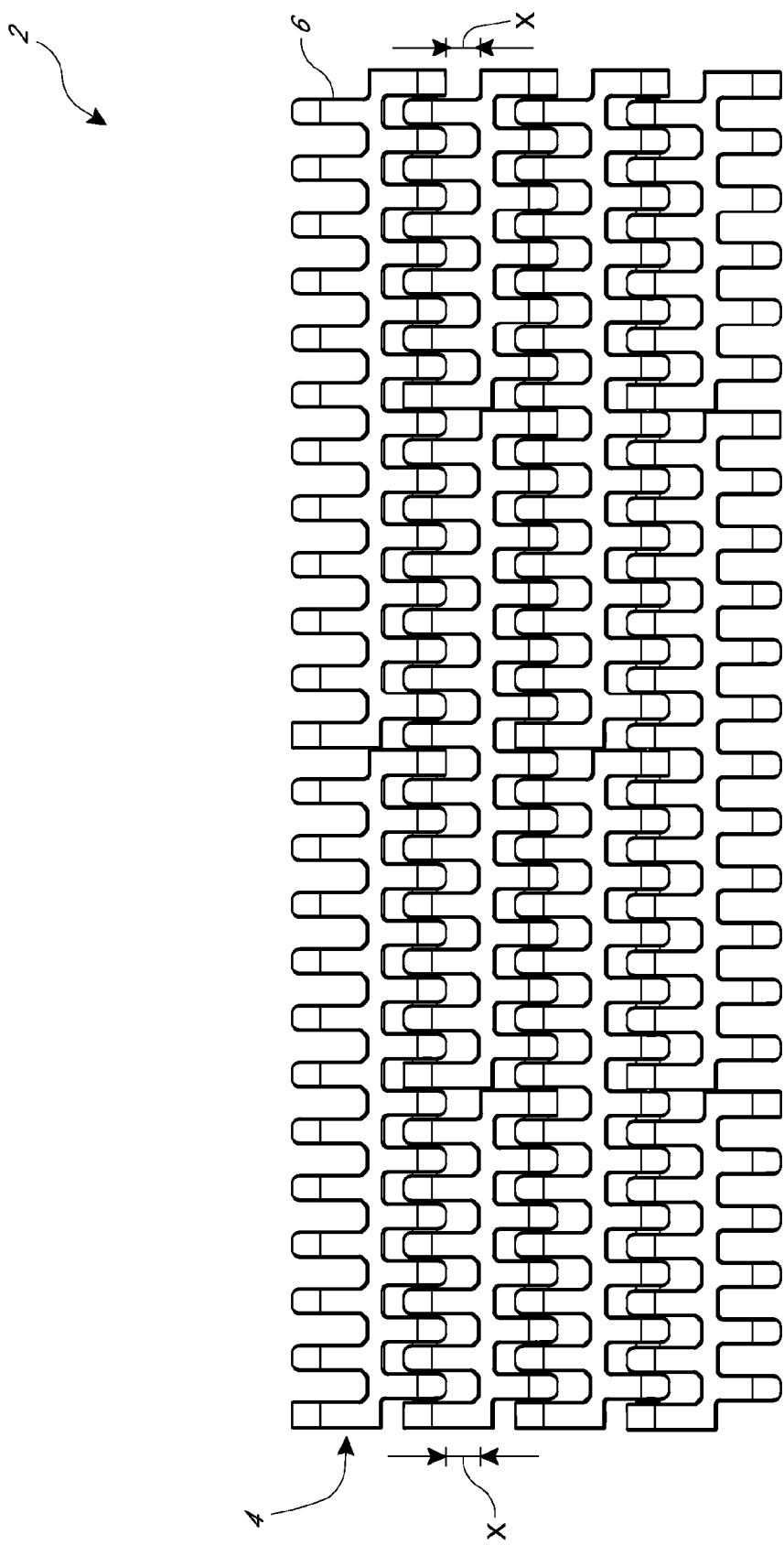
FIG. 2 illustrates a plan view of the portion of the side-flexing conveyor shown in FIG. 1.

FIGS. 1 and 2 illustrate a plurality of module rows 4 in a straight configuration. When the conveyor 2 is in the straight configuration, the module rows 4 are separated by essentially the same distance x on both lateral sides. The distance between a first end of a first module row and a first end of a second module row is substantially the same as a distance between a second end of the first module row and a second end of the second module row. As the conveyor 2 moves through a straight track section, the stress is generally evenly distributed along the width of the module row 4. Each link in the module row 4 can carry generally the same load, irrespective of the conveyor width.

Figure 3:
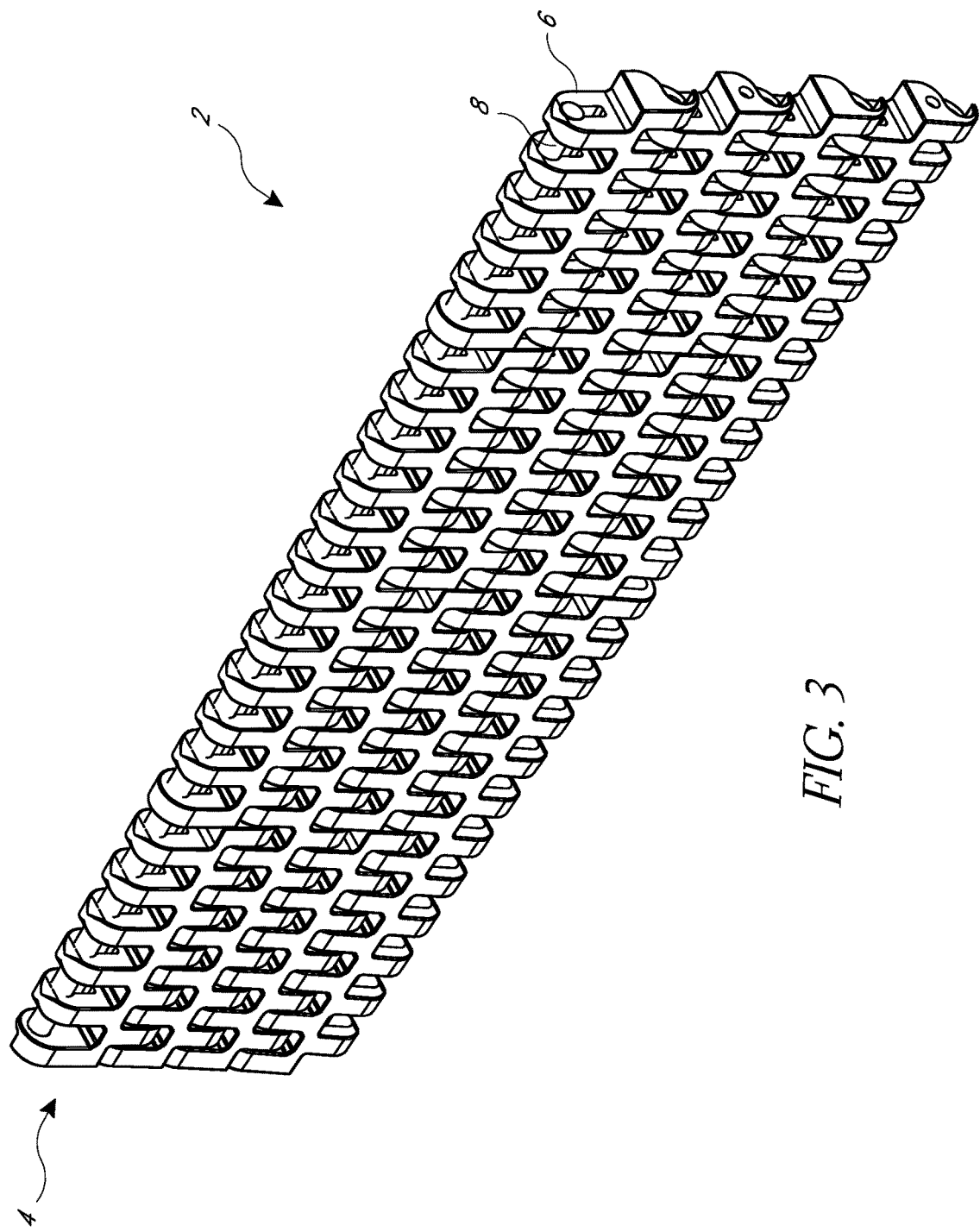
FIG. 3 illustrates a perspective view of the portion of the side-flexing conveyor in a flexed configuration.
Figure 4:
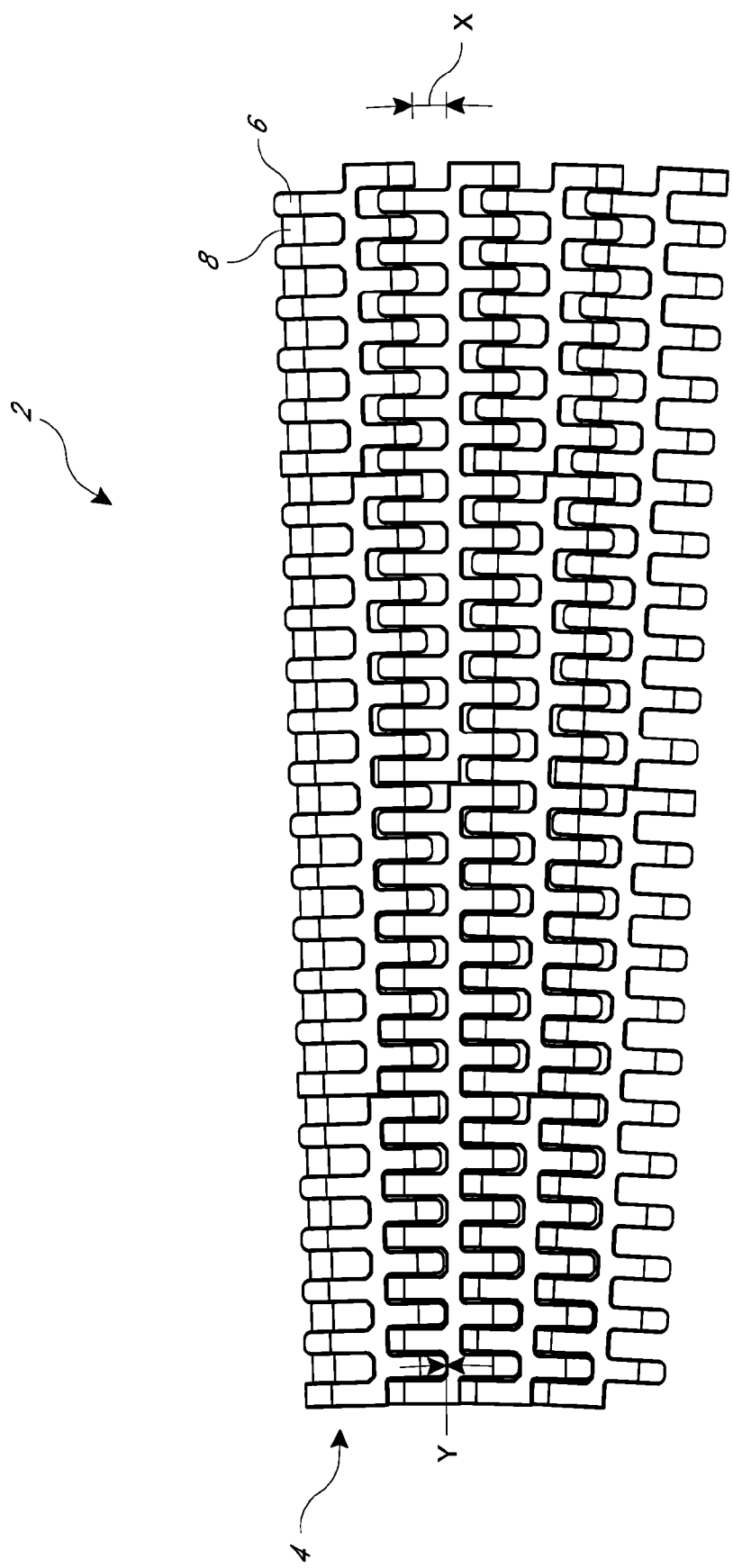
FIG. 4 illustrates a plan view of the portion of the side-flexing conveyor shown in FIG. 3.

FIGS. 3 and 4 illustrate the plurality of modules 6 in a flexed configuration such that the conveyor can be turned so as to convey products along a curvilinear or non-straight path. As the conveyor 2 flexes, the distance x between the first end of the first module row and the first end of the second module row differs from the distance y between the second end of the first module row and the second end of the second module row. As illustrated, during flexing, a plurality of consecutive rows is longer in the direction of travel on one lateral side than on the other lateral side. The lateral side with the shorter length along an edge of a collection of rows is generally the side on which lateral flexing of the conveyor occurs. For example, in the illustrated embodiment of FIG. 4, the distance along the collective of left edges of four consecutive modules is less than the distance along the collective right edges of the modules, and therefore the conveyor is flexing left. When the conveyor 2 flexes, the carry load is not generally uniform across the width of the conveyor and generally shifts laterally toward the region of the conveyor that has greater separation between module rows in the direction of travel (e.g., the lateral side that is generally opposite from the direction of flexing), irrespective of conveyor width.

In some embodiments, the radius of maximum curvature of side-flexing belts can be about or the same size as the belt width. In some embodiments, the radius of maximum curvature can be larger than the belt width. In some embodiments, the radius of maximum curvature can be at least about the same size of the belt width and/or less than or equal to about three times the belt width. In some embodiments, the radius of maximum curvature can be at least about the same size of the belt width and/or less than or equal to about two times the belt width. In some embodiments, the radius of maximum curvature can be at least about the same size of the belt width and/or less than or equal to about 1.5 times the belt width. In some embodiments, the radius of maximum curvature can be at least about 1.5 times the belt width and/or less than or equal to about 2.5 times the belt width. In some embodiments, the radius of maximum curvature can be at least about 1.8 times the belt width and/or less than or equal to about 2.2 times the belt width.

Figure 5:
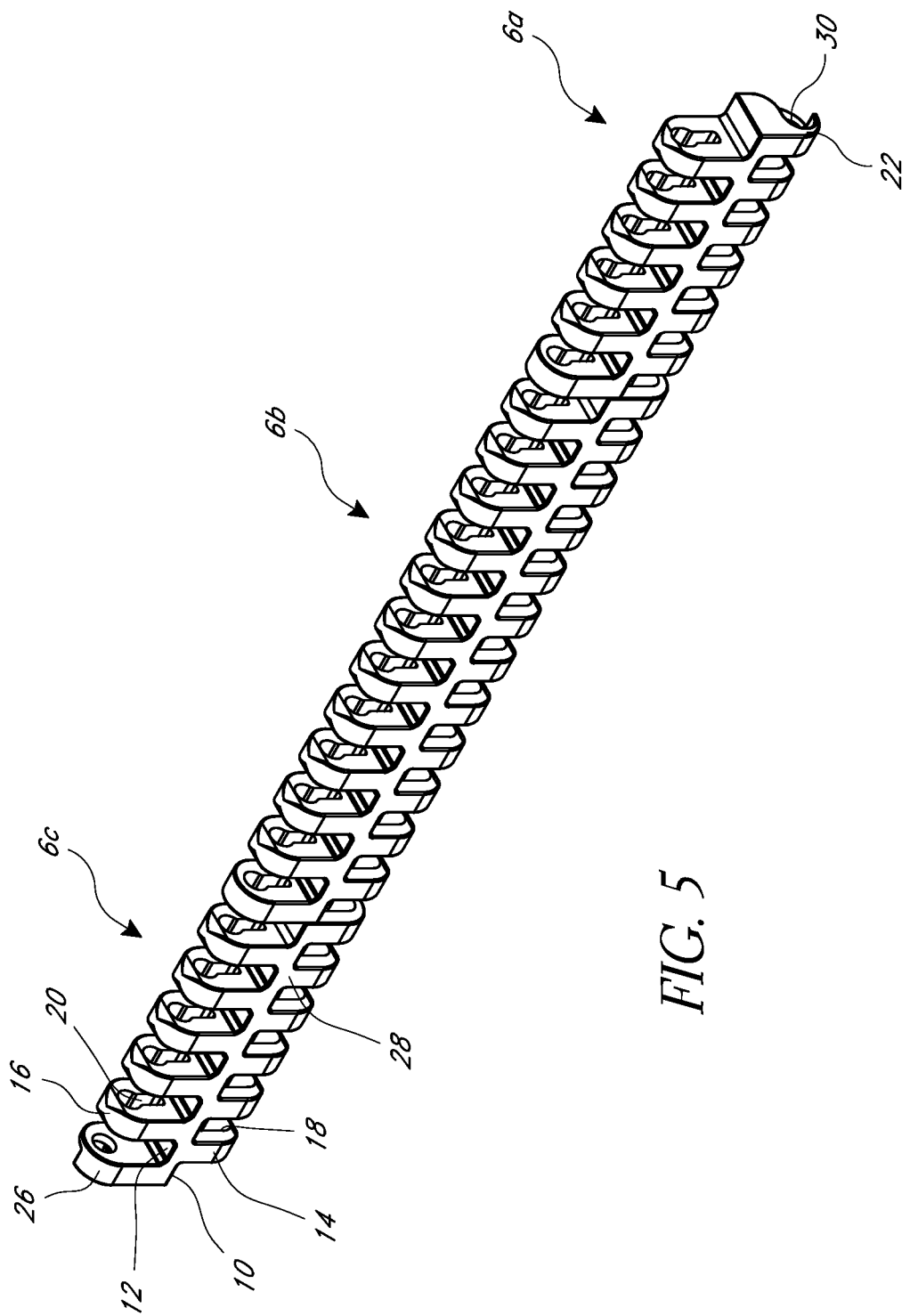
FIG. 5 illustrates a perspective view of a module row of the side-flexing conveyor shown in FIGS. 1-4.
Figure 6:
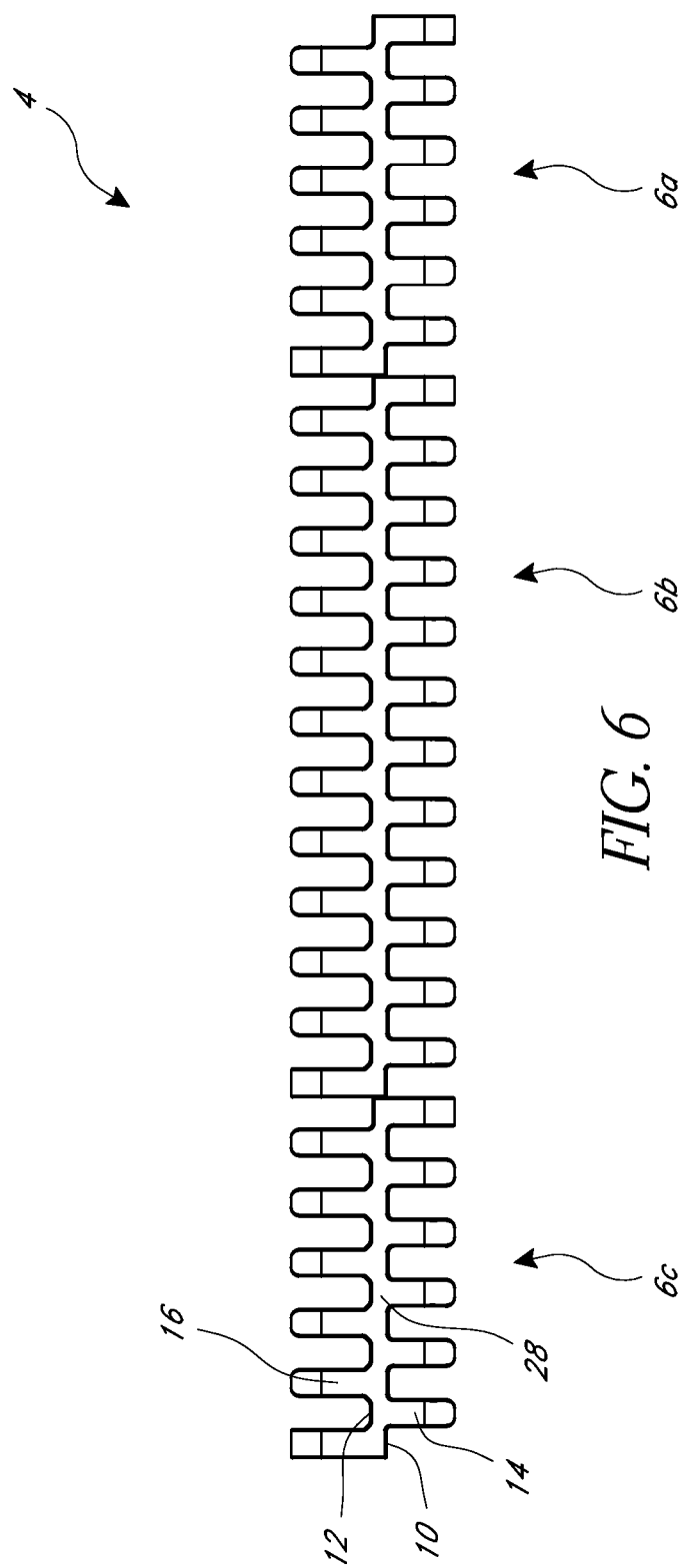
FIG. 6 illustrates a plan view of the module row shown in FIG. 5.

FIGS. 5 and 6 illustrate the module row 4. The modules 6 can be connected together by a rod (not shown) extending through the module apertures. The module rows 4 can include any number and combination of center or end modules. The length of each module 6 can vary within each module row 4 and from row to row.

Modules 6 of differing widths can be staggered to improve the strength of the conveyor 2. For example, as shown in FIGS. 1-4, a first module row and a third module row can include a first number of modules 6, and a second module row and a fourth module row can include a second number of modules 6. In addition, the widths of each module 6 in the first and third module rows can differ from the widths of each module 6 in the second and fourth module rows. As illustrated, the region or regions where two or more modules 6 abut laterally along a row can be different in consecutive rows.

The modules 6 can include a metal material, such as carbon steel or stainless steel. In some embodiments, the module may comprise a polymer, such a thermoplastic polymer (e.g., UHMW polyethylene). The module can include more than one type of material. For example, the module can include a stronger material in areas of the module that carry a greater load.

Figure 7A:
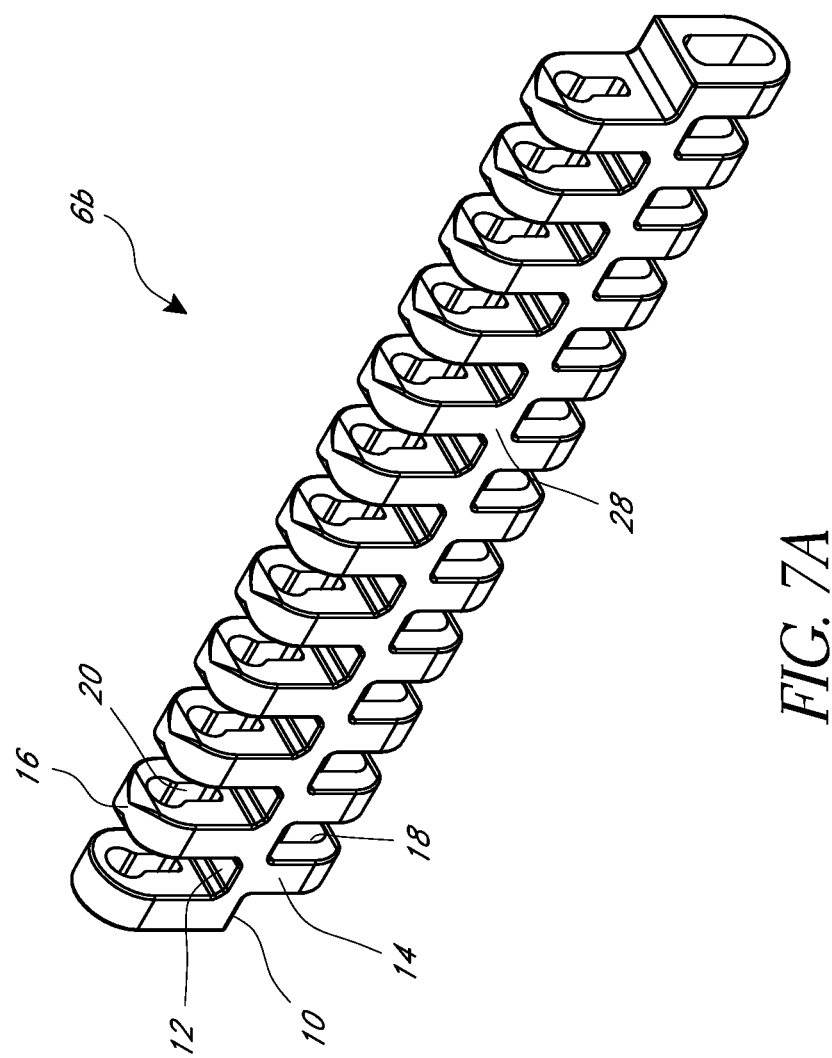
FIG. 7A illustrates a perspective view of a center module of the module row shown in FIG. 5.
Figure 7C:
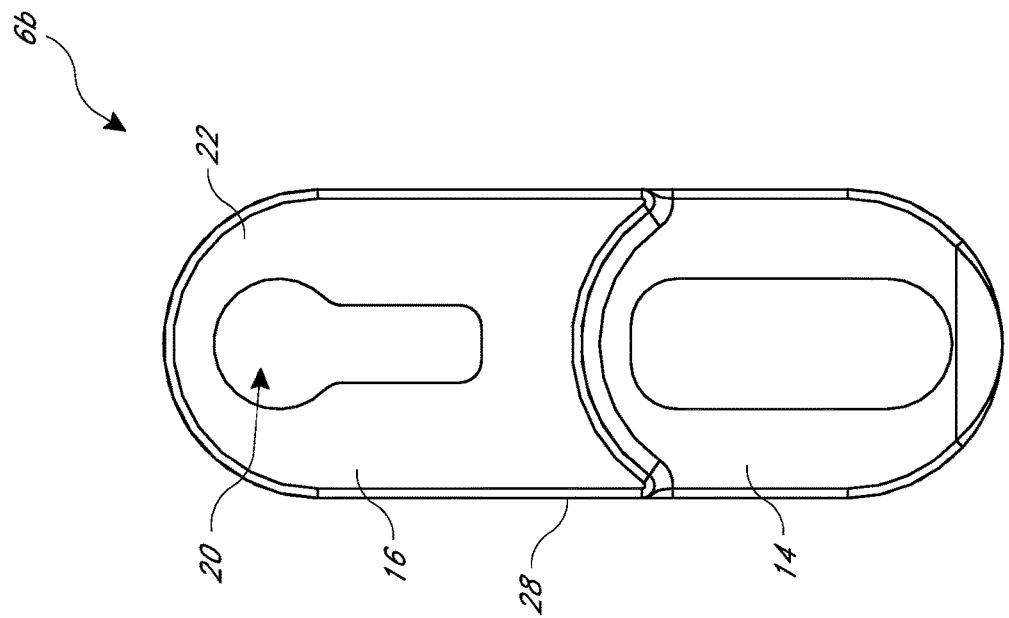
FIG. 7C illustrates another end of the center module shown in FIG. 7A.
Figure 7B:
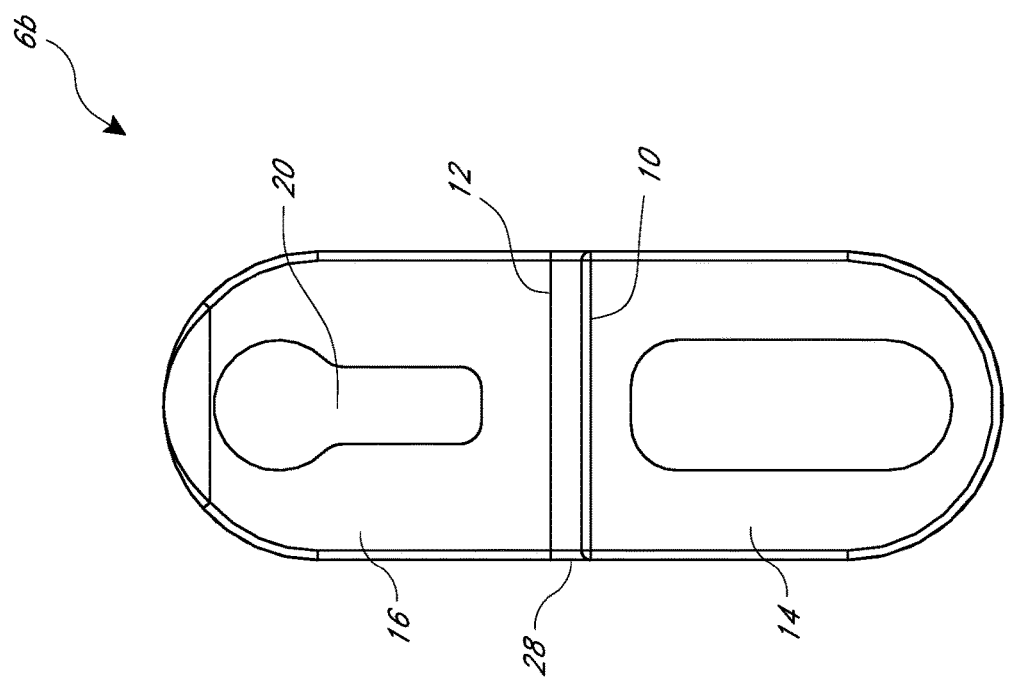
FIG. 7B illustrates an end of the center module shown in FIG. 7A.

FIGS. 7A-C illustrate different views of the central module 6b. FIG. 7B illustrates a first end of the central module 6b shown in FIG. 7A, while FIG. 7C illustrates a second end of the central module 6b shown in FIG. 7A. The module 6b includes a central portion 28 and one or more front links 16 and rear links 14 extending from the central portion 28. The module 6b also includes front gaps between the front links 16 and rear gaps between the rear links 14. The gaps have generally the same shape as the links (e.g., the width of a gap is generally about the same size as the width of a link, and the length of a gap is generally about the same size as the length of a link), such that links in adjacent rows are configured to essentially completely fill gaps in adjacent rows when consecutive module rows are pushed together or compressed along the direction of travel. This close correspondence between links and gaps provides high surface area on the conveyor for contacting and supporting conveyed items, and diminishes the risk that conveyed items will catch or snag on edges or in overly wide open regions within the gaps or between rows.

The front links 16 and gaps can be staggered with the rear links 14 and gaps. This staggered configuration permits a first module row to interlink with the links on an opposing side of a second module row as shown in FIGS. 1-4.

The module 6b includes a top load-bearing surface on which conveyed products typically rest, and a bottom surface facing the track. A thickness of the module 6b extends from the top surface to the bottom surface. The module 6b has a front region or edge on the side of the module in the direction of conveyor travel and a rear region or edge on the side of the module in the direction facing away from the direction of conveyor travel. A length of the module 6b extends from the front edge to the rear edge. The module 6b also has a width extending from a first lateral edge of the module to a second lateral edge of the module.

The thickness of the module 6b can be generally constant or uniform along at least a majority of the length of the module 6b. In some embodiments, such constant or uniform thickness is accomplished by providing nearly all or at least a majority of the surface area of the top region in the same plane and nearly all or at least a majority of the surface area of the bottom region in the same plane, without substantial protruding supports, struts, or connectors, or other structures, extending below or above such planes. In some embodiments, such constant or uniform thickness can occur along substantially the entire length of the module 6b, nearly the entire length of the module 6b, or the entire length of the module 6b. The thickness of the module 6b can be generally constant and uniform along at least a majority of the width of the module 6*b*, or along substantially the entire width of the module 6*b*, nearly the entire width of the module 6*b*, or the entire width of the module 6*b*. The maximum length of the module 6B can be generally constant or uniform along at least a majority of the width of the module 6B. For example, in a repeating section of a module comprising two forwardly directed links with a gap between them and two rearwardly directed links with a gap between them, the distance from an imaginary line along the front edge of the front links to an imaginary line along the rear edge of the rear links is generally uniform or constant along the width of a row of modules or along a majority of the width of a row of modules.

As shown in FIG. 7A, the central portion 28 is generally transverse and orthogonal to a direction of conveyor travel when the conveyor is not flexing. The central portion 28 includes a top load-bearing surface and a bottom surface facing the track. A thickness of the central portion 28 extends from the top surface to the bottom surface. The central portion 28 has a front side 12 facing the direction of conveyor travel and a rear side 10 facing away from the direction of conveyor travel. A length of the central portion 28 extends from the front side 12 to the rear side 10. The central portion 28 also has a width extending from a first lateral edge of the module to a second lateral edge of the module.

The top and bottom surfaces of the central portion 28 can each have a generally uniform, constant length. The length can be generally uniform and constant along at least a majority of the width of the central portion 28. The length can be generally uniform and constant along substantially the entire width of the central portion 28, nearly the entire width of the central portion 28, or the entire width of the central portion 28.

The central portion 28 can include a generally uniform, constant thickness. The thickness can be generally uniform and constant along at least a majority of the width of the central portion 28. The thickness can be generally uniform and constant along substantially the entire width of the central portion 28, nearly the entire width of the central portion 28, or the entire width of the central portion 28. The thickness can be generally uniform and constant along at least a majority of the length of the central portion 28. The thickness can be generally uniform and constant along substantially the entire length of the central portion 28, nearly the entire length of the central portion 28, or the entire length of the central portion 28.

The top and bottom surfaces of the central portion 28 can include a generally uniform, constant width. The width can be generally uniform and constant along at least a majority of the length of the central portion 28. The width can be generally uniform and constant along substantially the entire length of the central portion 28, nearly the entire length of the central portion 28, or the entire length of the central portion 28. The width can be generally uniform and constant along at least a majority of the thickness of the central portion 28. The width can be generally uniform and constant along substantially the entire thickness of the central portion 28, nearly the entire thickness of the central portion 28, or the entire thickness of the central portion 28.

The central portion 28 can include a main region that extends in a straight, non-tortuous path. In some embodiments, all portions of the front edge of the central portion are in front of the rear edge of the central portion. For example, in some embodiments, as illustrated, the rear portion of each front gap forms a leading front edge of at least a portion of the central portion, and the front portion of each rear gap forms a trailing edge of at least a portion of the central portion, and each rear portion of each front gap is positioned in front of each front portion of each rear gap. The straight, non-tortuous region can extend along at least a majority of the width of the central portion 28. The straight, non-tortuous region can extend along substantially the entire width of the central portion 28, nearly the entire width of the central portion 28, or along the entire width of the central portion 28. The straight, non-tortuous region can provide more rigidity along the width of the conveyor than a tortuous central portion, which helps increase conveyor strength as the conveyor flexes and reduces conveyor deformation during operation.

The top surface of the central portion can include a region that is generally flat or planar. The flat, planar region can extend along at least a majority of the width of the central portion 28. The flat, planar region can extend along substantially the entire width of the central portion 28, nearly the entire width of the central portion 28, or along the entire width of the central portion 28. Similarly, the bottom surface can include a region that is flat and planar along at least a majority of the width of the central portion 28. The flat load bearing surface can be desirable because it provides a flat surface to convey products and can be easier to clean and may be less likely to accumulate debris.

At least one of the front side 12 of the central portion 28 or the rear side 10 of the central portion 28 can include a generally concave region. For example, as shown in FIGS. 7B and 7C, the front side 12 of the central portion 28 can be planar, while the rear side 10 of the central portion 28 can be concave. The concave face allows the module 6*b* to move further toward an adjacent module row 4 when the conveyor flexes, which assists in providing a low turning radius for the conveyor. The concave face also diminishes the total amount of material required to manufacture the conveyor and therefore reduced the cost of the conveyor.

The central portion 28 can be generally dome-shaped. At least one of the front side 12 of the central portion 28 or the rear side 10 of the central portion 28 can be generally concave, while the other side can be generally convex. For example, the front side 12 of the central portion 28 can be generally planar, while the rear side 10 of the central portion 28 can be generally convex. The generally dome-shaped central portion 28 can help decrease the turning radius of the conveyor 2 and improve the rigidity of the central portion 28. This improved rigidity helps maintain the strength of the conveyor 2 when the conveyor flexes. The convex face of the central portion 128 also can reduce the open area between adjacent row modules 4.

In some embodiments, each module 6*b* includes a multiple number of rear links 14 extending from the rear side 10 of the central portion 28 and a multiple number of front links 16 extending from the front side 12 of the central portion 28. The front links 16 and the rear links 14 can be integrally formed with the central portion 28. The module 6*b* also includes a rear gap between any two adjacent rear links 14 and a front gap between any two adjacent front links 16. The plurality of links can be at least about: two links, three links, six links, twelve links, or any other number of links.

As shown in FIG. 7A, the front links 16 and the rear links 14 can extend in a direction generally perpendicular to the central axis of the central portion 28 extending along the width of the central portion 28. The front links 16 and the rear links 14 can extend in a direction generally perpendicular to the straight, non-tortuous region of the central portion 28. The front links 16 can be staggered from the rear links 14.

The front links 16 and the rear links 14 can include a top load-bearing surface and a bottom surface facing the track. A thickness of the links extends from the top surface to the bottom surface. The front links 16 have a front edge facing the direction of conveyor travel and the rear links 14 have a rear edge facing away from the direction of conveyor travel. A length of the front link 16 extends from a front side 12 of the central portion 28 to the front edge of the front link 16. A length of the rear link 14 extends from a rear side 10 of the central portion 28 to the rear edge of the rear link 14. The links have a width extending from a first lateral edge of the link to a second lateral edge of the link.

The top surface of the front links 16 and the rear links 16 can include a region that is generally flat and generally planar. The generally flat, planar region can extend along at least a majority of the length of the front links 16 or rear links 14. The generally flat, planar region can extend along substantially the entire length of the links, nearly the entire length of the links, or along the entire length of the links. Similarly, the bottom surface can include a region that is generally flat and planar along at least a majority of the length of the front links 16 and rear links 14. The generally flat load-bearing surface can be desirable because it provides a flat surface to convey products and can be easier to clean, and less likely to accumulate debris.

The rear end portion of at least one of the rear links 14 can be generally tapered along the first lateral surface of the rear link 14 and/or the second lateral surface of the rear link 14. The generally tapered surface can be generally rounded or generally planar. As shown in FIG. 7A, the generally tapered lateral surfaces of the rear links 14 are generally planar. At least a majority of the rear links 14 can include a tapered rear end portion. The at least a majority of the rear links 14 can be substantially all of the rear links 14, nearly all of the rear links 14, or all of the rear links 14. As the conveyor flexes, the tapered rear end portions can move further toward the adjacent module row 4 and decrease the turning radius of the conveyor. The tapered rear end portions also reduce friction between the module rows 4.

The length of each rear link 14 can be substantially the same along at least a majority of the width of the rear link 14. The length of the rear link 14 can be substantially the same along substantially the entire width of the rear link 14, along nearly the entire width of the rear link 14, or along the entire width of the rear link 14.

The length of each rear link 14 can be greater than the length of the central portion 28. The length of each rear link 14 can be greater than the length of the central portion 28 along at least a majority of the width of the rear link 14, along substantially the entire width of the rear link 14, along nearly the entire width of the rear link 14, or along the entire width of the rear link 14.

The thickness of the rear links 14 can be substantially the same along at least a majority of the width of the rear link 14. The length of the rear links 14 can be substantially the same along substantially the entire width of the rear link 14, nearly the entire width of the rear link 14, or the entire width of the rear link 14.

In some embodiments, the width of each rear link 14 can be substantially the same along at least a majority of the length of the rear link 14. The width of the rear links 14 can be the substantially the same along substantially the entire length of the rear link 14, nearly the entire length of the rear link 14, or the entire length of the rear link 14.

The rear end portion of at least one of the rear links 14 can be generally tapered along a top surface of the rear link 14 and/or a bottom surface of the rear link 14. The generally tapered surface can be rounded or planar. As shown in FIG. 7A, the generally tapered top and bottom surfaces of the rear links 14 are generally rounded. The rear links 14 can include a generally tapered rear end portion along at least a majority of the rear links 14, along nearly all of the rear links 14, or along all of the rear links 14. The tapered rear end portions reduce friction between the module rows 4.

The length of each rear link 14 can be substantially the same along at least a majority of the thickness of the rear link 14. The length of the rear links 14 can be substantially the same along substantially the entire thickness of the rear link 14, nearly the entire thickness of the rear link 14, or the entire thickness of the rear link 14.

The thickness of each rear link 14 can be substantially the same along at least a majority of the length of the rear link 14. The thickness of the rear link 14 can be substantially the same along substantially the entire length of the rear link 14, nearly the entire length of the rear link 14, or the entire length of the rear link 14.

In some embodiments, at least a majority of the rear links 14 have substantially the same shape and/or size. In some embodiments, all of the rear links 14, substantially all of the rear links 14, or nearly all of the rear links 14, can have substantially the same shape and/or size. The thicknesses of at least a majority of the rear links 14 of the module 6b can be generally the same. In some embodiments, the thicknesses of substantially all of the rear links 14, nearly all of the rear links 14, or all of the rear links 14, can be generally the same.

Each rear link 14 can include an aperture 18. The rear link aperture 18 is shaped and sized to permit the rear link 14 to move relative to the rod 8. For example, the rear link aperture 18 can be an elongated aperture. The rear link aperture 18 can include a length extending along the direction of conveyor travel when not flexing. The length of the rear link aperture 18 can be substantially greater than a thickness of the rear link aperture 18.

In some embodiments, the module 6b can include a rear gap between any two rear links 14. The rear gap includes a front edge along the rear edge of the central portion 28 and shares a lateral edge with each of the two adjacent rear links. The front edge of the gap can be generally perpendicular to the lateral edges of the gap, as illustrated. The lateral edges of the rear gap can be longer than the front edge of the rear gap.

The rear gap includes a front side along the rear side 10 of the central portion 28 and shares a lateral side with each of the two adjacent rear links 14. The length of the rear gap extends from the front side of the rear gap to the rear side of the module 6b. The width of the rear gap extends from a first lateral side of the rear gap to a second lateral side of the rear gap. The width of the rear gap can substantially the same or slightly larger than the width of the links. In some embodiments, as illustrated, the face of the front side of the gap can be generally perpendicular to the direction of travel of the conveyor and/or generally perpendicular to the lateral sides of the gap, without an overhanging surface suspended between the lateral sides of the gap.

For example, in some embodiments, the width of the rear gap can be substantially the same along at least a majority of the length of the rear gap, or along substantially the entire length of the rear gap, or along nearly the entire length of the rear gap, or along the entire length of the rear gap.

The length of the rear gap can be substantially the same along at least a majority of a width of the rear gap, or along the entire width of the rear gap, or along nearly the entire width of the rear gap, or along the entire width of the rear gap.

The length of the rear gap can be substantially the same along at least a majority of the thickness of the adjacent rear links. The length can be substantially the same along substantially the entire thickness, nearly the entire thickness, or the entire thickness of the adjacent rear links. In some embodiments, there is a plurality of front gaps between adjacent pairs of front links, and a plurality of rear gaps between adjacent pairs of rear links. The length of each front gap, from the front edge of the central portion to a front edge of the module, can be substantially the same along substantially the entire thickness of an adjacent front link, from a top surface of the module to a bottom surface of the module, and the length of each rear gap, from the rear edge of the central portion to a rear edge of the module, can be substantially the same along the entire thickness of an adjacent rear link, from the top surface of the module to the bottom surface of the module.

At least a majority of the rear gaps can have substantially the same shape and/or size. The proportion of rear gaps with substantially the same shape and/or size can be substantially all of the rear gaps, nearly all of the rear gaps, or all of the rear gaps. For example, the widths and/or lengths of at least a majority of the rear gaps of the module 6b can be generally the same.

The front end portion of at least one of the front links 16 can be generally tapered along the first lateral surface of the front link 16 and/or the second lateral surface of the front link 16. The generally tapered surface can be rounded or planar. As shown in FIG. 7A, the generally tapered lateral surfaces of the front links 16 are planar. At least a majority of the front links 16 can include a generally tapered front end portion. In some embodiments, substantially all of the front links 16, nearly all of the front links 16, or all of the front links 16 can include a generally tapered front end portion. As the conveyor 2 flexes, the generally tapered front end portions can move further toward the adjacent module row 4 and decrease the turning radius of the conveyor. The generally tapered front end portions also reduce friction between the module rows 4.

The length of each front link 16 can be substantially the same along at least a majority of the width of the front link 16. The length of the front link 16 can be substantially the same along substantially the entire width of the front link 16, nearly the entire width of the front link 16, or the entire width of the front links 16.

The length of each front link 16 can be greater than the length of the central portion 28. The length of each front link 16 can be greater than the length of the central portion 28 along at least a majority of the width of the front link 16, along substantially the entire width of the front link 16, along nearly the entire width of the front link 16, or along the entire width of the front link 16.

The thickness of each front link 16 can be substantially the same along at least a majority of the width of the front link 16. The thickness of the front links 16 can be substantially the same along substantially the entire width of the front link 16, nearly the entire width of the front link 16, or the entire width of the front link 16.

A width of each front link 16 can be substantially the same along at least a majority of the length of the front link 16. The width of the front links 16 can be substantially the same along substantially the entire length of the front link 16, nearly the entire length of the front link 16, or the entire length of the front link 16.

The front end portion of at least one of the front links 16 can be generally tapered along a top surface of the front link 16 and/or a bottom surface of the front link 16. The generally tapered surface can be generally rounded or generally planar. As shown in FIG. 7A, the tapered top and bottom surfaces of the front links 16 are rounded. A generally tapered front end portion can be provided on at least a majority of the front links 16, on substantially all of the front links 16, on nearly all of the front links 16, or on all of the front links 16. The generally tapered front end portions reduce friction between the module rows 4.

The length of each front link 16 can be substantially the same along at least a majority of a thickness of the front link 16. The length of the front link 16 can be substantially the same along the entire thickness of the front link 16, nearly the entire thickness of the front link 16, or the entire thickness of the front link 16.

The thickness of each front link 16 can be substantially the same along at least a majority of the length of the front link 16. The thickness of the front link 16 can be substantially the same along the entire length of the front link 16, nearly the entire length of the front link 16, or the entire length of the front link 16.

In some embodiments, at least a majority of the front links 16 can have substantially the same shape and/or size. In some embodiments, substantially all of the front links 16, nearly all of the front links 16, or all of the front links 16 can have substantially the same shape and/or size. For example, the lengths of at least a majority of the front links 16 of the module 6b can be generally the same. Substantially all of the front links 16, nearly all of the front links 16, or all of the front links 16 can have lengths that are generally the same. The widths of at least a majority of the front links 16 of the module 6b can be the same. Substantially all of the front links 16, nearly all of the front links 16, or all of the front links 16 can have widths that are generally the same. The thicknesses of at least a majority of the front links 16 of the module 6b can be generally the same. Substantially all of the front links 16, nearly all of the front links 16, or all of the front links 16 can have generally the same thicknesses.

Each front link 16 can include an aperture 20. As shown in FIG. 7A, the front link aperture 20 can comprise a portion that is generally rounded and a portion that is generally slotted. The front link aperture 20 can be shaped and sized in any manner to fix the front link 16 relative to the rod 8. The shape of the aperture 20 can assist in positioning the front link 16 relative to the rod 8, while minimizing the amount of module material. Fixing the front links 16 relative to the rod 8 can help control the conveyor 2 as it flexes.

The module 6b includes a front gap between any two front links 16. The front gap includes a rear edge along the front edge of the central portion 28 and shares a lateral edge with each of the two adjacent front links 16. The rear edges of the front gaps are generally perpendicular to the lateral edges of the front gaps. The lateral edges of the front gap can be longer than the rear edge of the front gap.

The front gap can include a rear side along the front side 12 of the central portion 28 and shares a lateral side with each of the two adjacent front links 16. The length of the front gap extends from the rear side of the front gap to the front side of the module 6b. The width of the front gap extends from a first lateral side of the front gap to a second lateral side of the front gap. The width of the front gap can be substantially the same or slightly larger than the width of the links. In some embodiments, as illustrated, the face of the rear side 10 of the gap can be generally perpendicular to the direction of travel of the conveyor and/or generally perpendicular to the lateral sides of the gap, without an overhanging surface suspended between the lateral sides of the gap.

The width of the front gap can be generally the same along at least a majority of the length of the front gap. Substantially the entire length of the front gap, nearly the entire length of the front gap, or the entire length of the front gap, can have a width that is generally the same.

The length of the front gap can be the same along at least a majority of a width of the front gap. The at least a majority of the width can be substantially the entire width of the front gap, nearly the entire width of the front gap, or the entire width of the front gap.

The length of the front gap can be substantially the same along at least a majority of the thickness of the adjacent front links. The length of the front gab can be substantially same along substantially the entire thickness, nearly the entire thickness, or the entire thickness of the adjacent front links.

At least a majority of the front gaps can have substantially the same shape and size. Substantially all of the front gaps, nearly all of the front gaps, or all of the front gaps can have substantially the same shape and size. For example, the widths of at least a majority of the front gaps of the module 6b can be the same. The at least a majority of the front gaps can be substantially all of the front gaps, nearly all of the front gaps, or all of the front gaps. The lengths of at least a majority of the front gaps of the module 6b can be the same. The at least a majority of the front gaps can be substantially all of the front gaps, nearly all of the front gaps, or all of the front gaps. The thicknesses of at least a majority of the front gaps of the module 6b can be generally the same. Substantially all of the front gaps, nearly all of the front gaps, or all of the front gaps, can have thicknesses that are generally the same.

At least a majority of the rear links 14 can have a length the same as the length of the front links 16. The at least a majority of the rear links 14 can be substantially all of rear links 14, nearly all of the rear links 14, or all of the rear links 14.

Figure 8A:
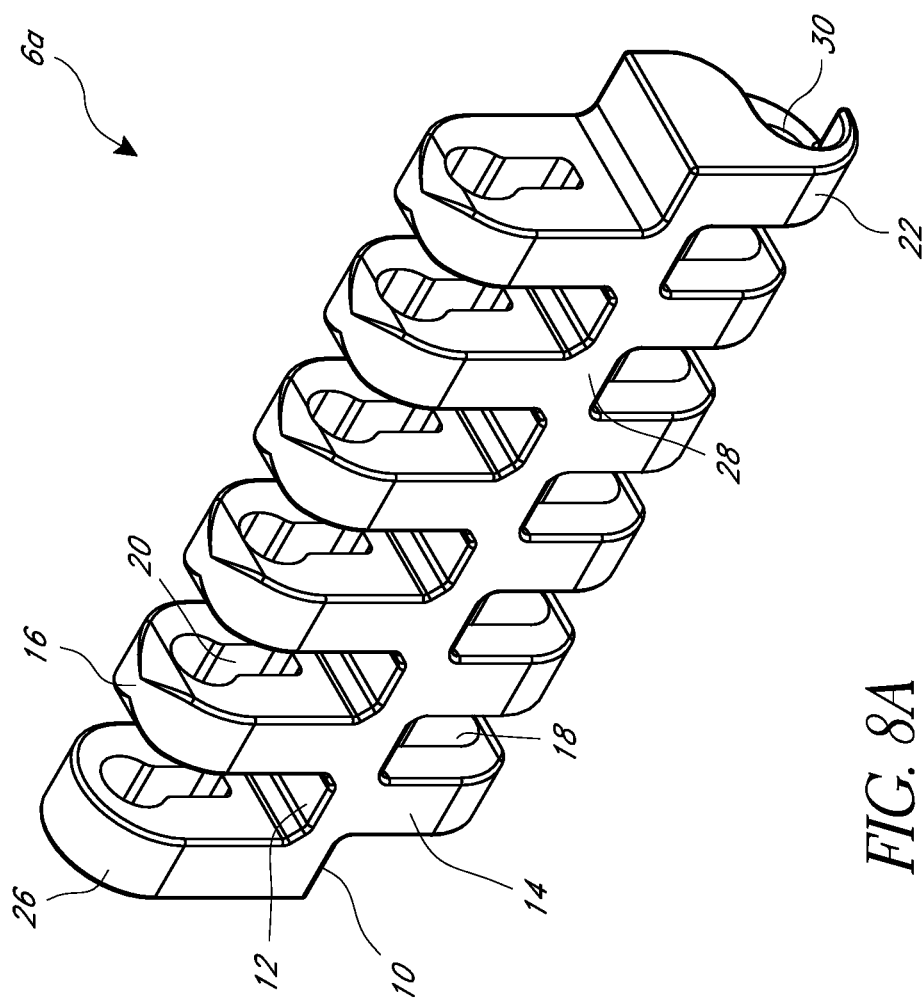
FIG. 8A illustrates a perspective view of an end module of the module row shown in FIG. 5.

FIGS. 8A-8C illustrate different views of the end module 6a. FIG. 8B illustrates a first end of the end module 6a, and FIG. 8C illustrates a second end of the module 6a. The end module can include any of the features described above in reference to module 6b.

The end module 6a can include a rod-securing rear link 22. The rod securing rear link 22 restricts axial movement of the rod. The rod (not shown) can include a flange portion that engages with an opening 30 in the rear link 22. As shown in FIG. 8B, the rod-securing rear link 22 can include a curved lateral surface. The rod can include a tab portion positioned adjacent to the curved lateral surface when the rod is connected to the module 6a. Although the rear link apertures 16 generally permit movement of the module 6a relative to the rod, the rod-securing rear link 22 can include an aperture 24 configured to fix the end of module 6a relative to the rod 8. For example, the aperture 24 can be round. The rod-securing rear link 22 can include a second aperture to permit uniform material cooling during molding. Further description of an example of a rod-securing rear link 22 can be found in U.S. Pat. No. 7,699,160 or U.S. Pub. No. 2009/0308716. The entire contents of both references are incorporated by reference.

Some or all of the front apertures 20 of end module 6a can have varying widths to reduce the turning radius of the conveyor when the conveyor flexes. The subset can include any number of links. A length of a first front aperture can be longer than a length of a second front aperture, adjacent to the first elongated aperture. The length of the second front aperture can be longer than a length of a third front aperture, adjacent to the second front aperture. The difference in length between the first elongated aperture and the second elongated aperture is the same as the difference in length between the second elongated aperture and the third elongated aperture, such that the bearing edges of the subset of front link apertures 20 form a general linear progression. In some embodiments, the general linear progression of the bearing edges can form an angle of less than or equal to about 1° relative to the bearing edge of the keyhole apertures not included in the linear progression. The angle can be less than or equal to about 0.5°, between about 0.25° and about 0.75°, or between about 0.5° and about 1°. Although the linear progression was discussed in reference to the front apertures 20, the rear apertures 18 can also differ in length to form a linear progression along the bearing edge of the rear apertures 18.

The width of the central portion 28 can vary along the length of the module 6a. For example, the width of the central portion 28 can be narrower toward the rod-securing rear link 22. The narrow portion of the central portion 28 can reduce the turning radius by providing more room for the links of the adjacent module row 4 to move further. If the central portion 28 includes a generally convex face, the narrow portion of the central portion 28 can reduce interference between the generally convex face of the central portion 28 and the links of the adjacent module row 4. The central portion 28 can include generally convex-shaped indents, chamfers, or a combination of convex-shaped indents and chamfers between links. Symmetrical cuts can help the conveyor flex in both directions.

The width of the front or rear gaps can vary along the length of the gaps, such that the width of a portion of the gap closer to the central portion 28 is wider than a portion of the gap closer to the edge of the module 6a. The wider gap portion near the central portion 28 allows the module 6a to move closer to the adjacent module row.

The length of one or more front links 16 can differ from the length of one or more rear links 14. If the front side 12 of the central portion 28 is convex, then it may be desirable for the rear links 14 of the adjacent module row to be shorter to maintain the desired turning radius. Otherwise, in some embodiments, movement of rear links 14 of the adjacent module row may be restricted by the convex face of the central portion 28.

The length of the links can also differ along one side of the module 6b to decrease the turning radius of the conveyor. Shorter links toward the end of the module 6b provide more space for the links to move toward the adjacent module row as the conveyor flexes. Shorter links can also prevent interference between the links and the central portion 28 of the adjacent row module as the conveyor flexes. Longer links toward the center of the module row 4 can reduce the size of the openings between each module.

Figure 9A:
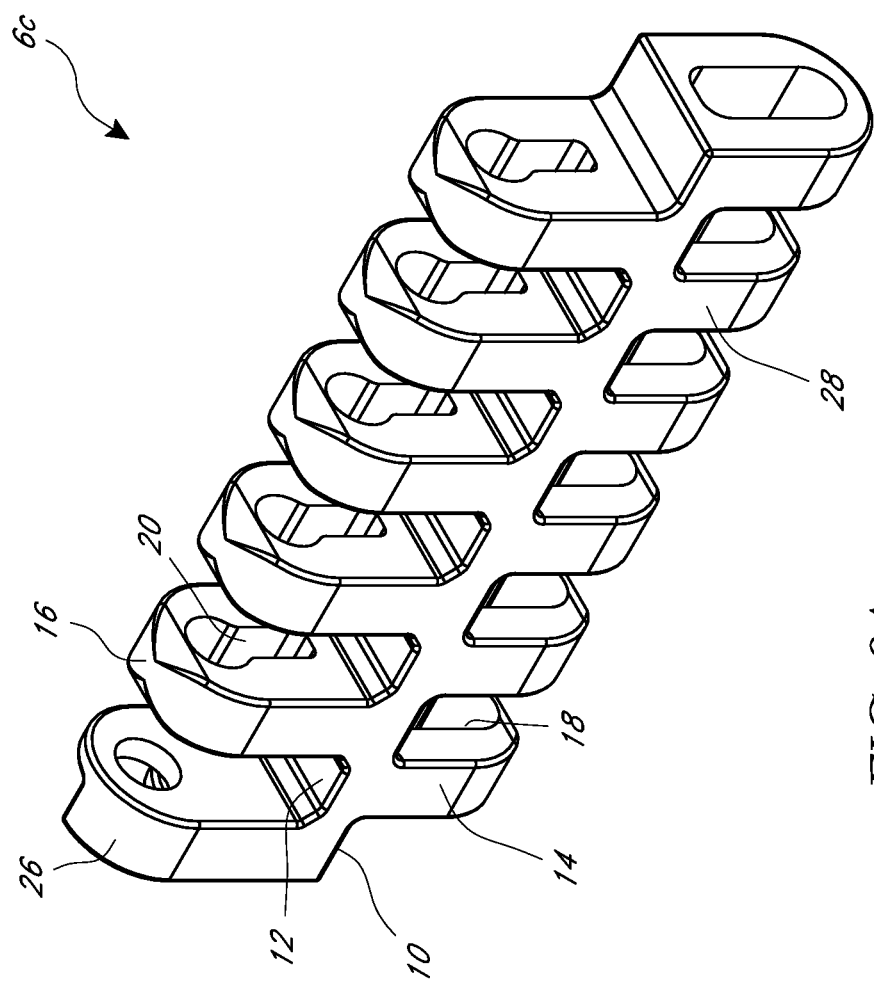
FIG. 9A illustrates a perspective view of another end module of the module row shown in FIG. 5.
Figure 9C:
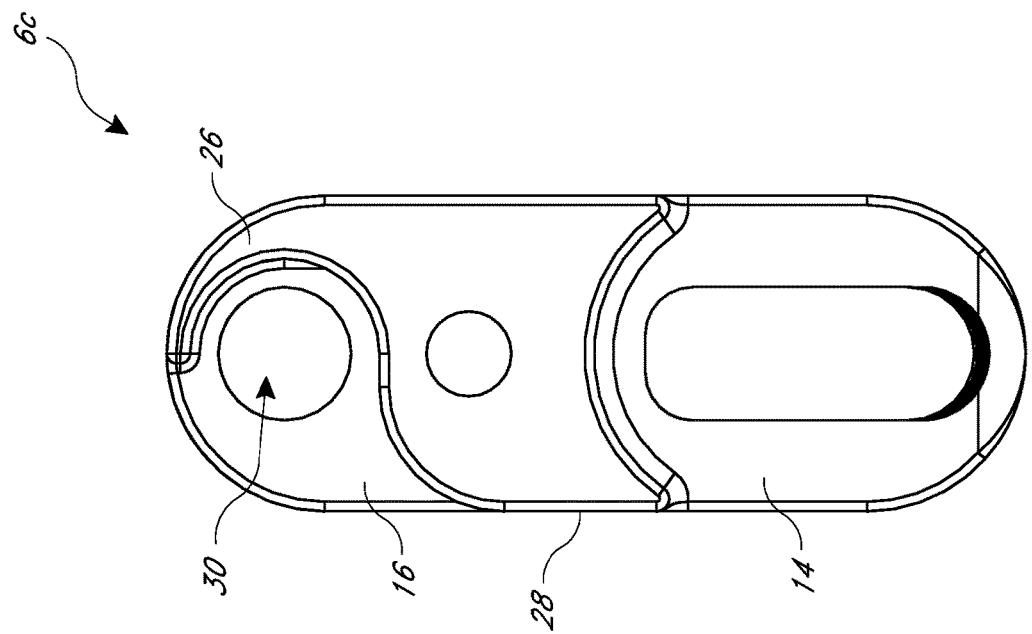
FIG. 9C illustrates another end of the end module shown in FIG. 9A.
Figure 9B:
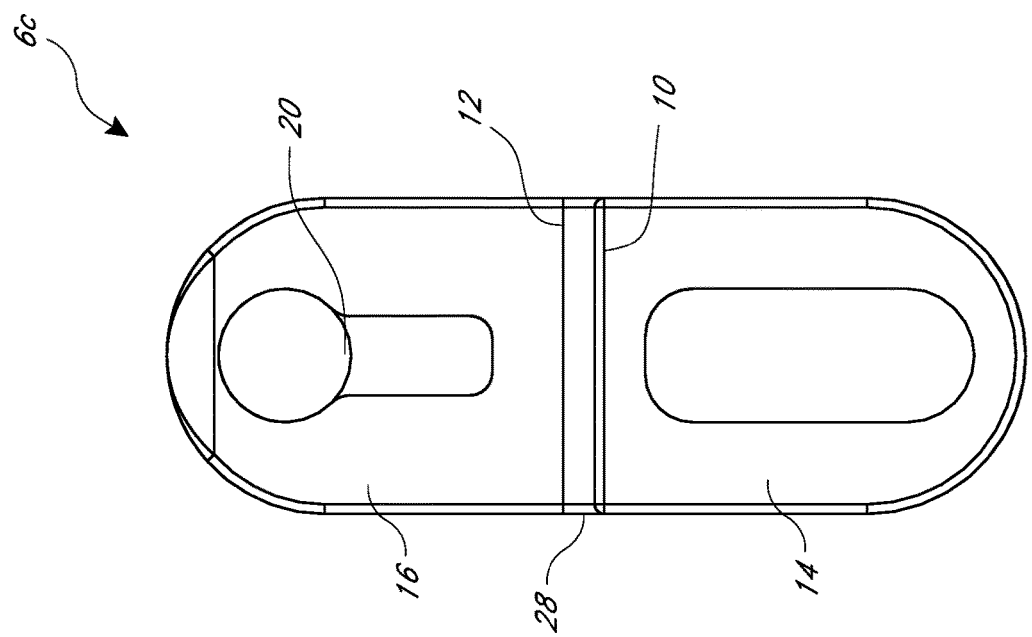
FIG. 9B illustrates an end of the end module shown in FIG. 9A.

FIGS. 9A-9C illustrate different views of the end module 6c. FIG. 9B illustrates a first end of module 6c, and FIG. 9C illustrates a second end of module 6c. The end module can include any of the features described above in reference to modules 6a, 6b.

End module 6c can include a rod-securing front link 26. The rod can include a flange portion that engages with the opening 32 in the rod-securing front link 26. The rod-securing front link 26 restricts axial movement of the rod. As shown in FIG. 9C, the rod-securing front link 26 can include a curved lateral surface. The rod can include a tab portion positioned adjacent to the curved lateral surface when the rod is connected to module 6c. Although the front link openings 14 generally include a keyhole shaped aperture (e.g., an aperture with a general round portion and a generally slotted portion), the rod-securing front link 26 can include a circular aperture to help fix the end of module 6c relative to the rod. The rod-securing front link 26 can include a second opening to permit uniform material cooling during molding. Further description of the rod-securing front link 26 can be found in U.S. Pat. No. 7,699,160 or U.S. Pub. No. 2009/0308716. The entire contents of both references are incorporated by reference.

Figure 10:
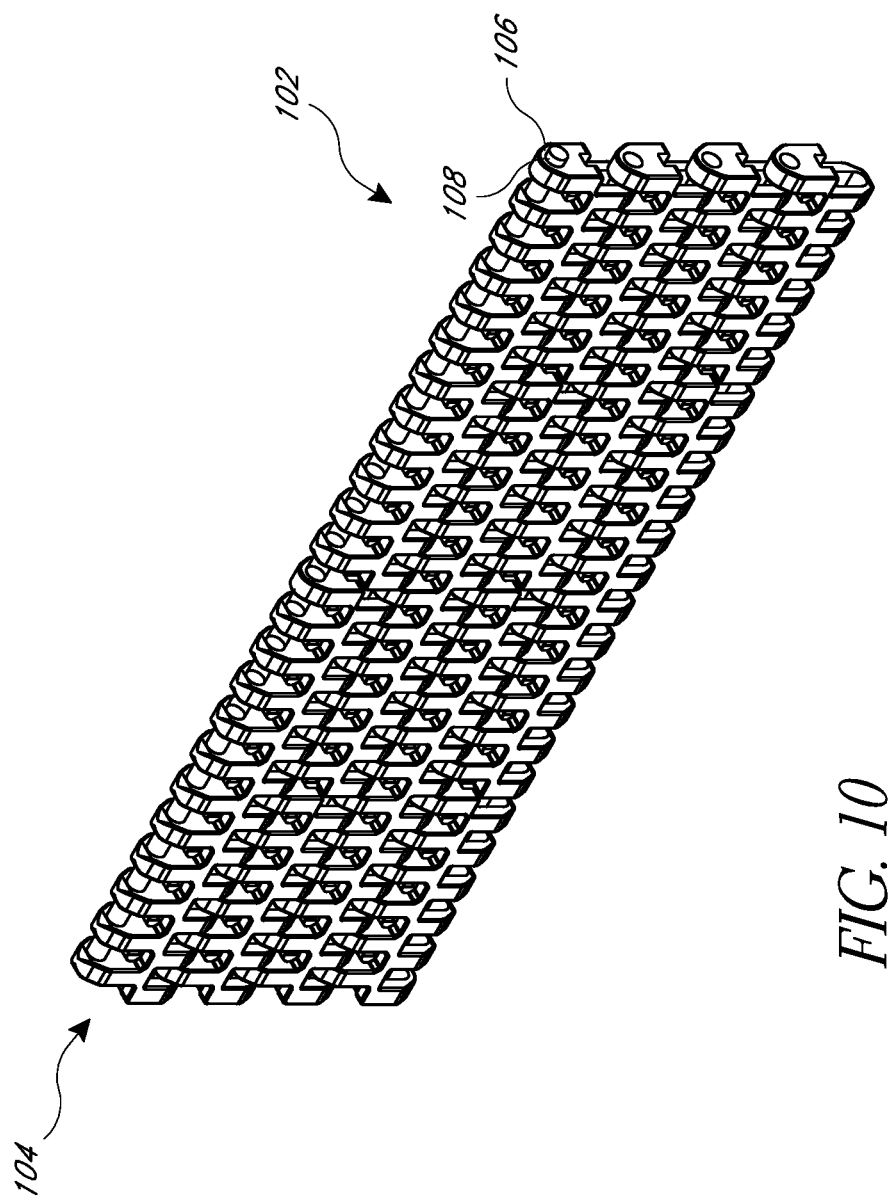
FIG. 10 illustrates a perspective view of a portion of another side-flexing conveyor in a straight configuration.
Figure 11:
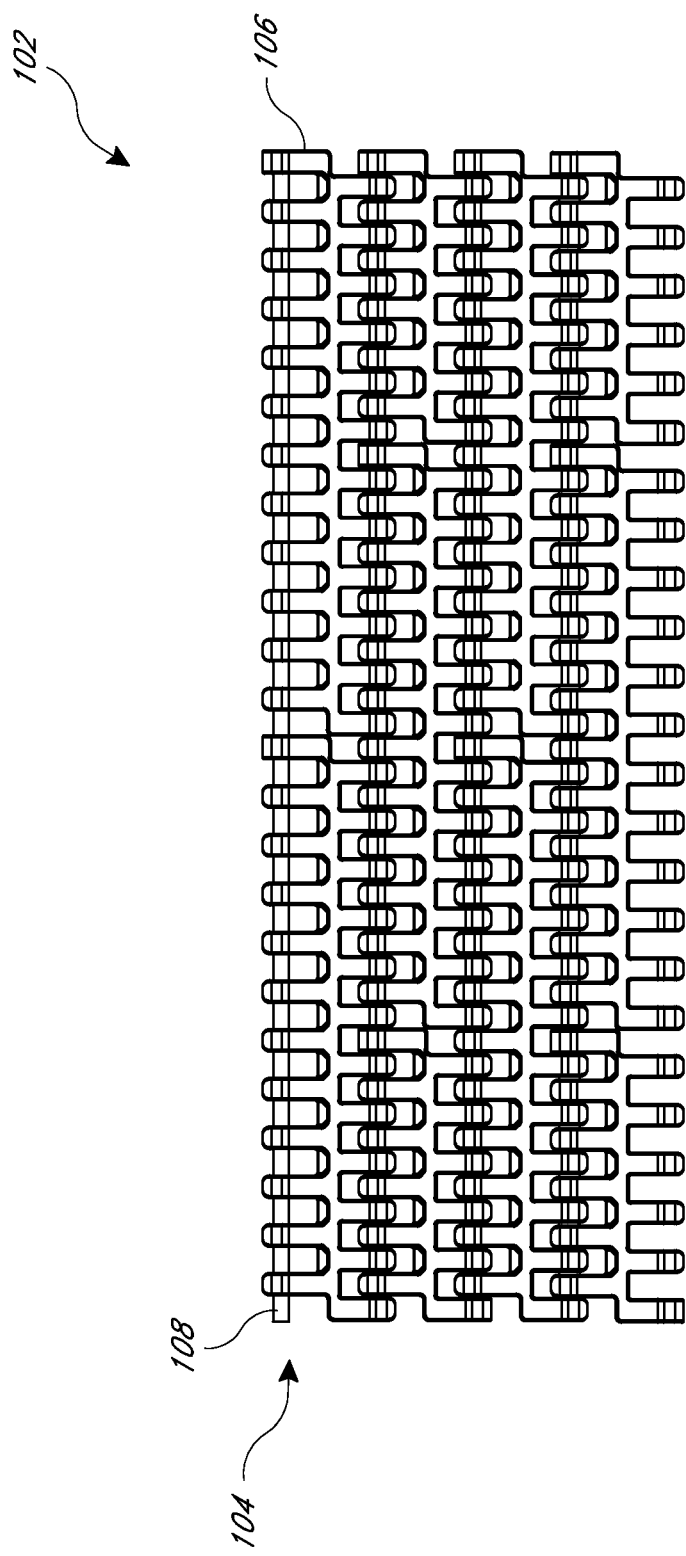
FIG. 11 illustrates a plan view of the portion of the side-flexing conveyor shown in FIG. 10.

FIGS. 10 and 11 illustrate a plurality of module rows 104 in a straight configuration. The embodiment illustrated in these figures is similar or identical to the embodiment illustrated in FIGS. 1-9 in many ways and the disclosure for those figures applies to this embodiment as well. The side-flexing conveyor 2 can include a multiple number of modules 106 connected together by rods 108. Each rod 108 joins two module rows 104 to increase the length of the conveyor 102, and each module row 104 can include one or more modules 106 depending on the desired width of the conveyor 102.

Figure 12:
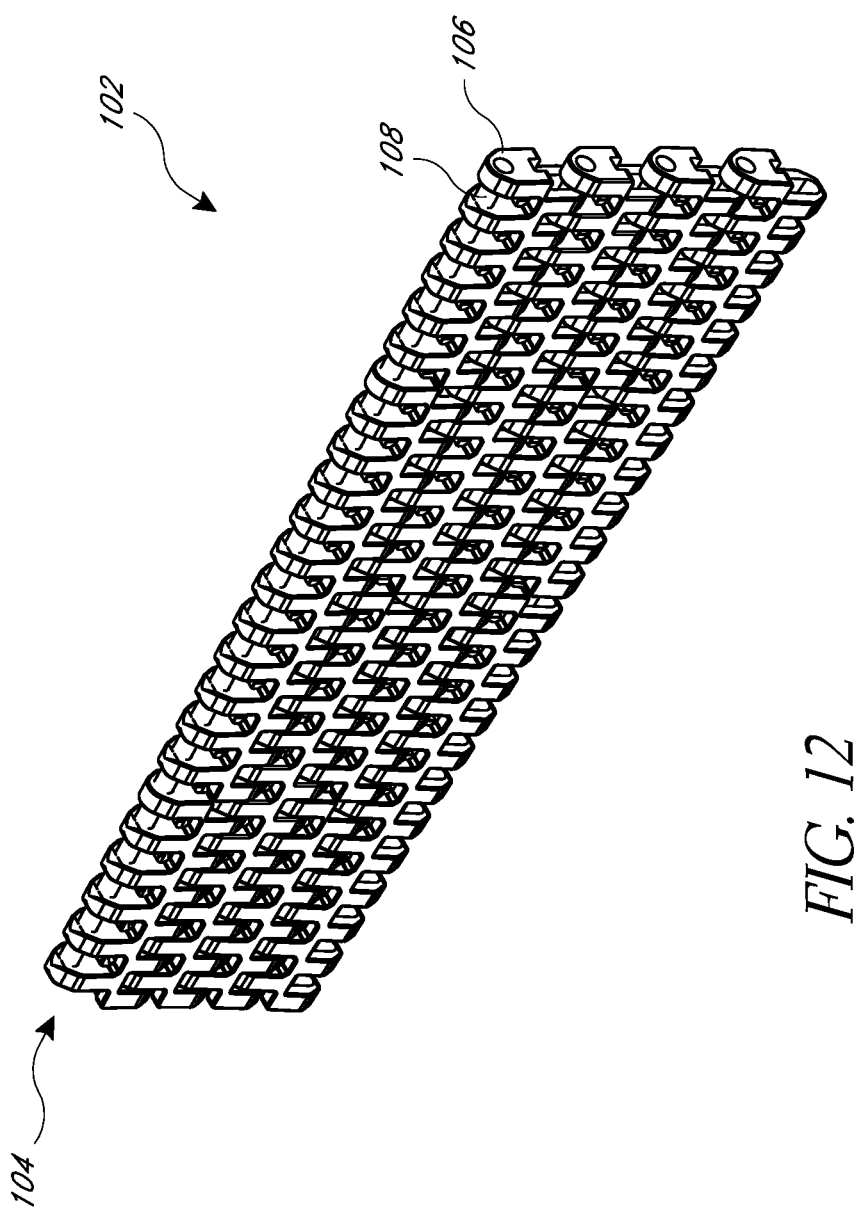
FIG. 12 illustrates a perspective view of the portion of the side-flexing conveyor shown in FIG. 10 in a flexed configuration.
Figure 13:
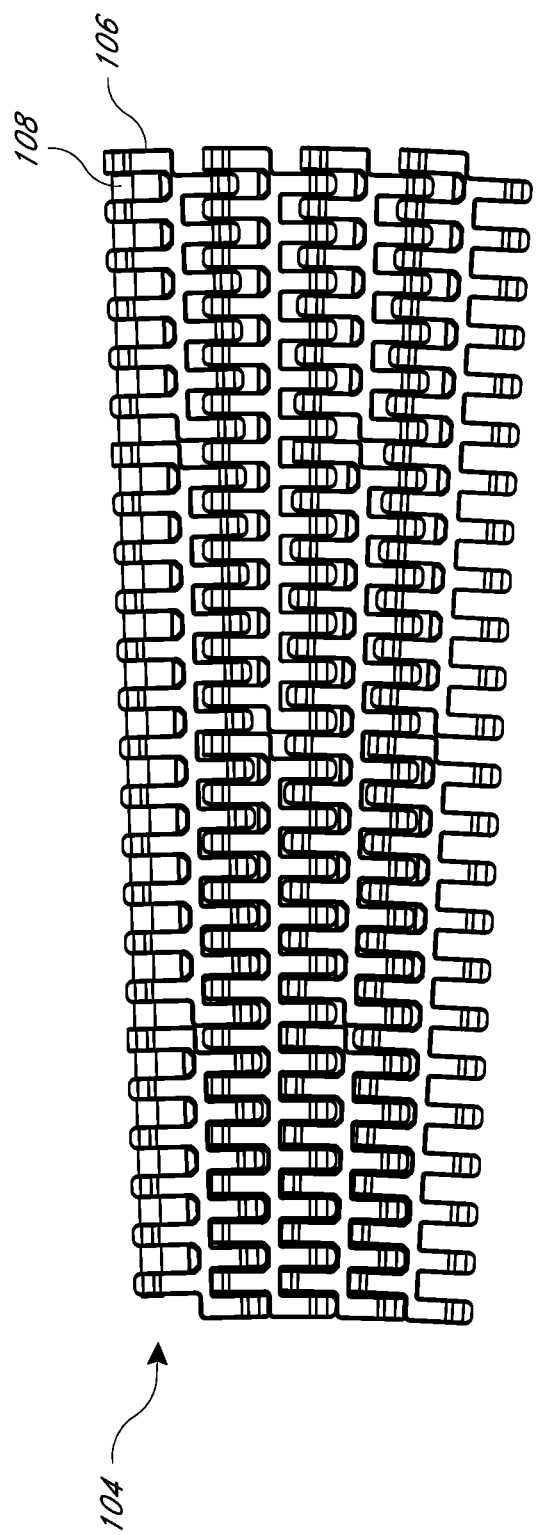
FIG. 13 illustrates a plan view of the portion of the side-flexing conveyor shown in FIG. 12.

FIGS. 12 and 13 illustrate a plurality of module rows 104 in a flexed configuration. As the conveyor 102 flexes, a portion of a first module row moves toward a second module row and reduces the space between the portion of the first module row and the second module row.

Figure 14:
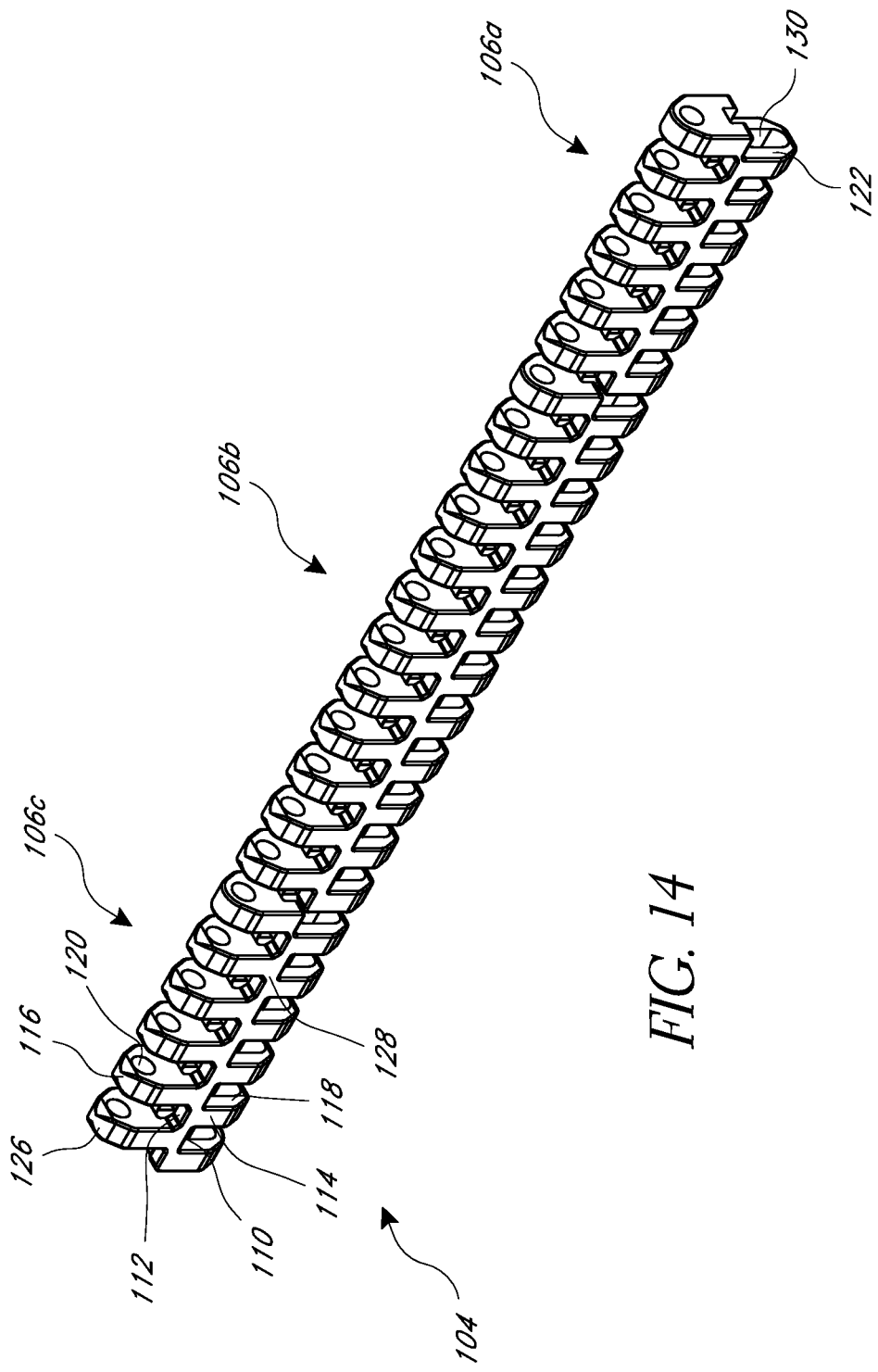
FIG. 14 illustrates a perspective view of a module row of the side-flexing conveyor shown in FIGS. 10-13.

FIGS. 14 and 15 illustrate the module row 104. The module row 104 can include any number and combination of modules 106. The modules 106 are connected together by a rod (not shown). The length of each module 106 can vary within each module row 104 and from row to row.

Modules of differing widths can be staggered to improve the strength of the conveyor. For example, as shown in FIGS. 10-13, a first module row and a third module row can include a first number of modules 106, and a second module row and a fourth module row can include a second number of modules 106. In addition, the widths of each module 106 in the first and third module rows can differ from the widths of each module 106 in the second and fourth module rows.

FIGS. 16A-D illustrate a module 106b. The module 106b can include any of the features of modules 6a, 6b, or 6c described herein. As shown in FIGS. 16A-D, the module 106b can include an axial aperture 134 extending through the central portion 128. The axial aperture 134 reduces the total amount of material in the module 106b. A plurality of rear links 114 can extend from a rear side 110 of a central portion 128 and a multiple number of front links 116 extend from a front side 112 of the central portion 128. The plurality of links can be at least about: two links, three links, six links, twelve links, or any other number of links.

Each rear link 114 can include an aperture 118. The rear link aperture 118 is shaped and sized to permit the rear link 114 to move relative to the rod 8. For example, the rear links 114 can include an elongated aperture.

Figure 18A:
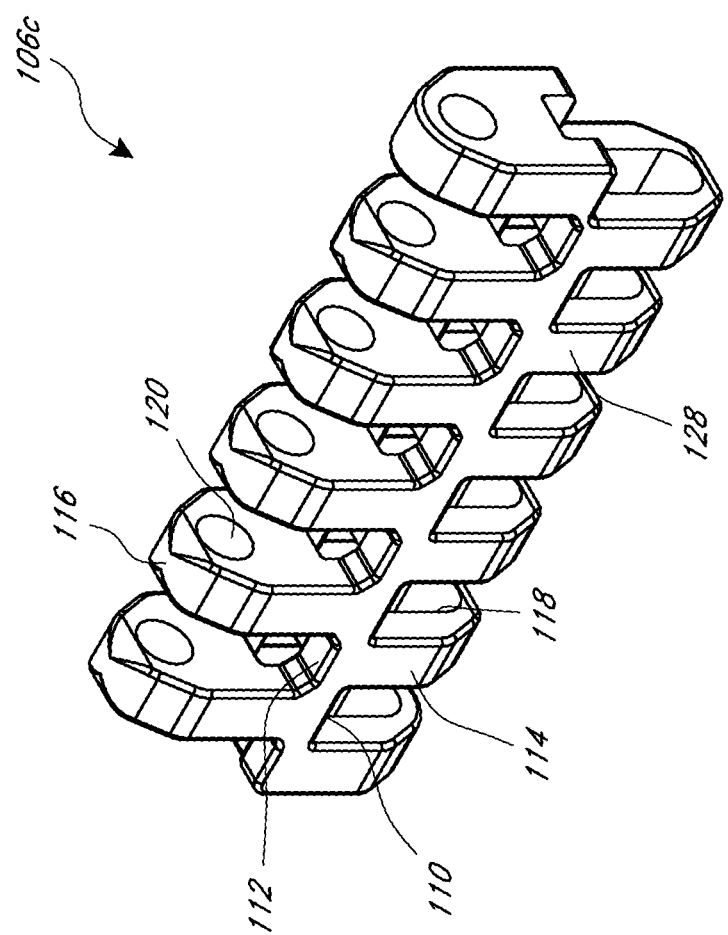
FIG. 18A illustrates a perspective view of another module of the module row shown in FIG. 14.
Figure 18C:
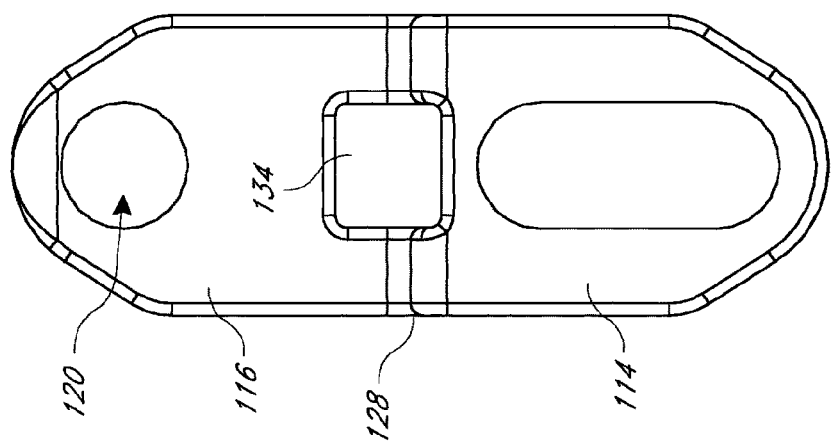
FIG. 18C illustrates another end of the module shown in FIG. 18A.
Figure 18B:
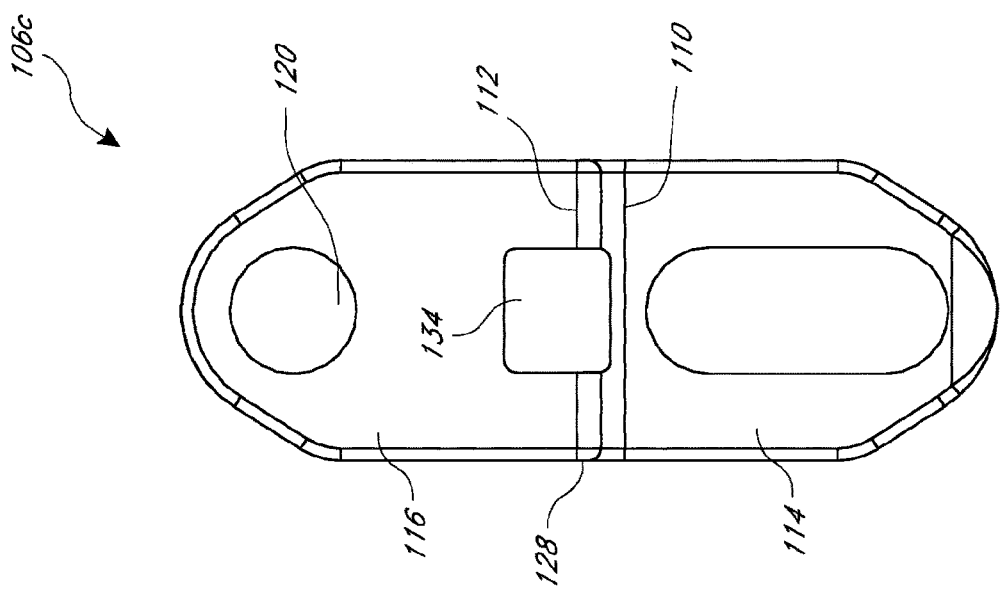
FIG. 18B illustrates an end of the module shown in FIG. 18A.

Each front link 116 can include an aperture 120. As shown in FIG. 18A, the front link aperture 120 is rounded to fix the position of the front link 116 relative to the rod 108. Fixing the front links 116 relative to the rod 108 provides better control as the conveyor 102 moves through the curved track section. The front links can also include a second aperture to minimize the total amount of material.

Figure 16A:
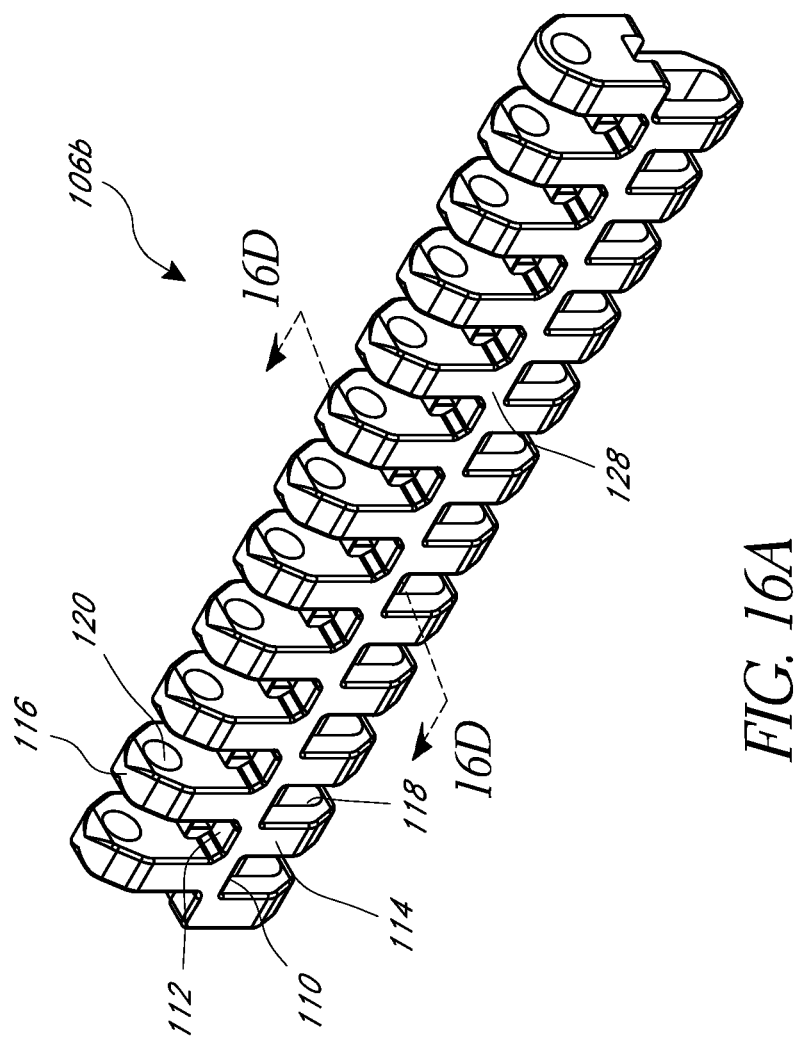
FIG. 16A illustrates a perspective view of a module of the module row shown in FIG. 14.
Figure 16C:
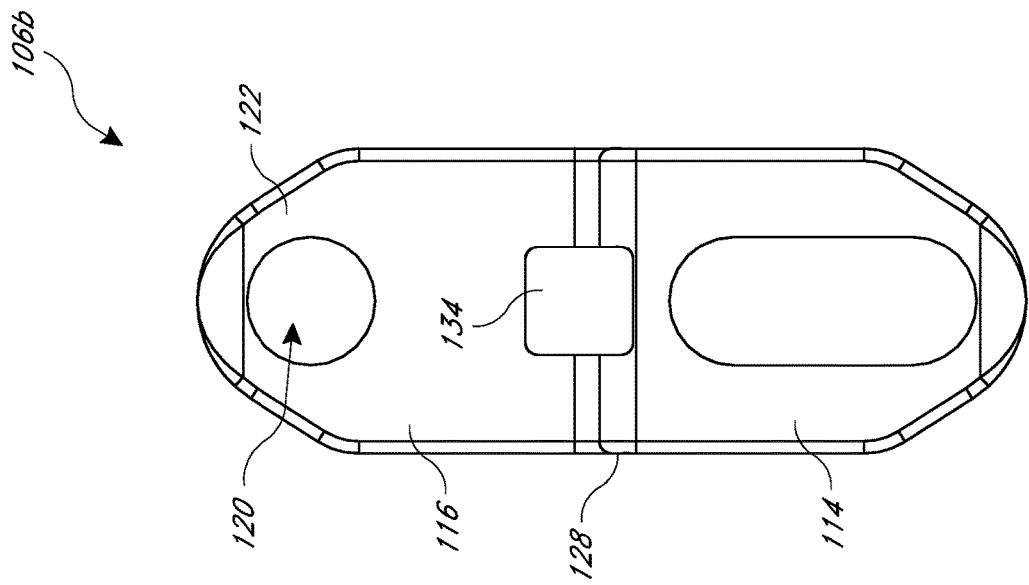
FIG. 16C illustrates another end of the module shown in FIG. 16A.
Figure 16B:
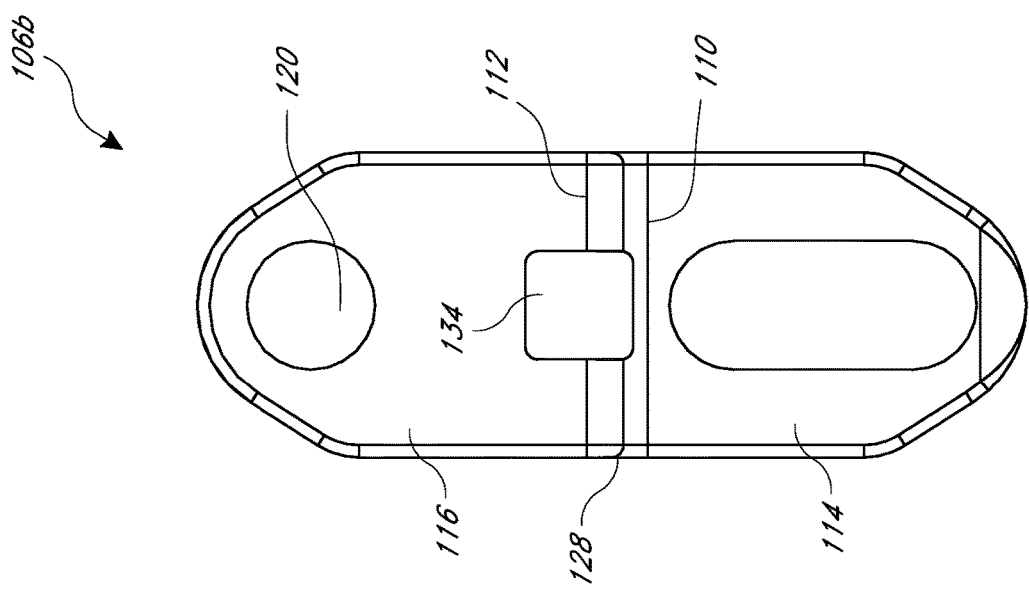
FIG. 16B illustrates an end of the module shown in FIG. 16A.

As shown in FIGS. 16B-C, the rear links 114 and front links 116 can include a chamfer edge. The chamfer edge allows the links to move further toward the adjacent module row and decreases the radius ratio.

Figure 16D:
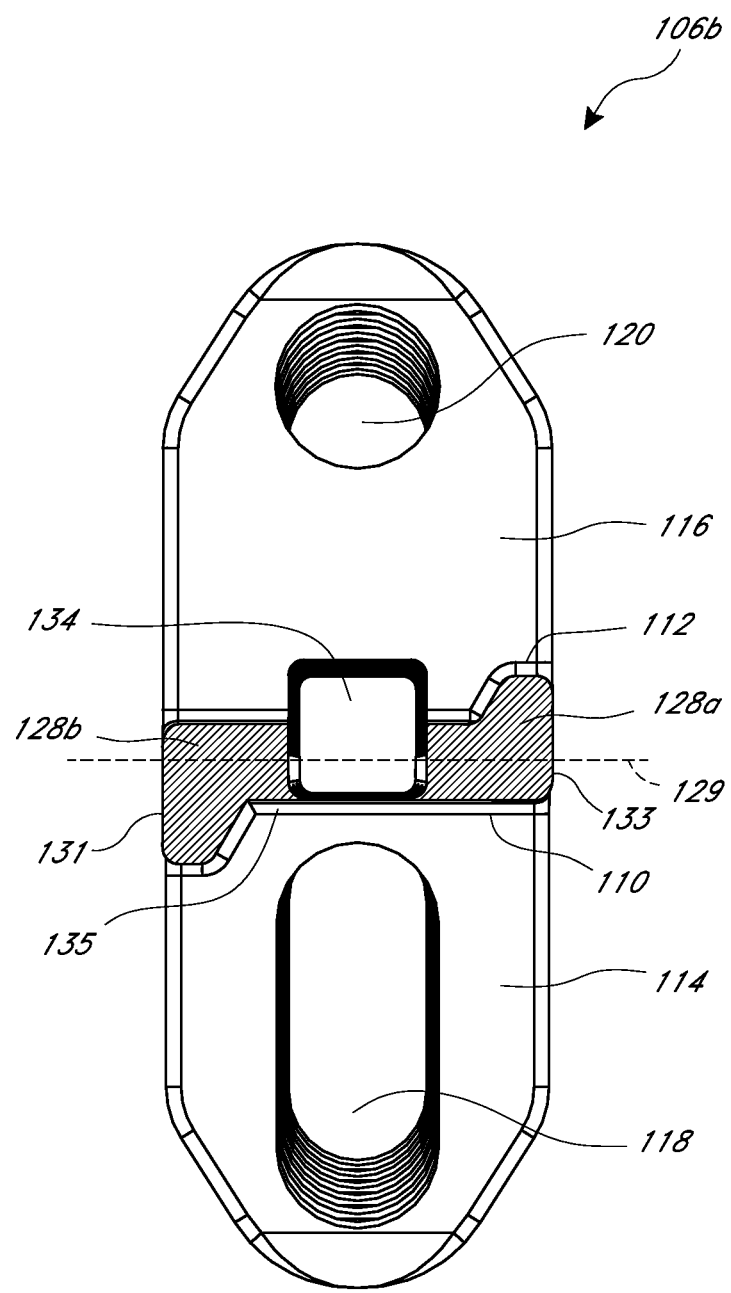
FIG. 16D illustrates a cross section of the module shown in FIG. 16A through line 16D-16D.
Figure 17A:
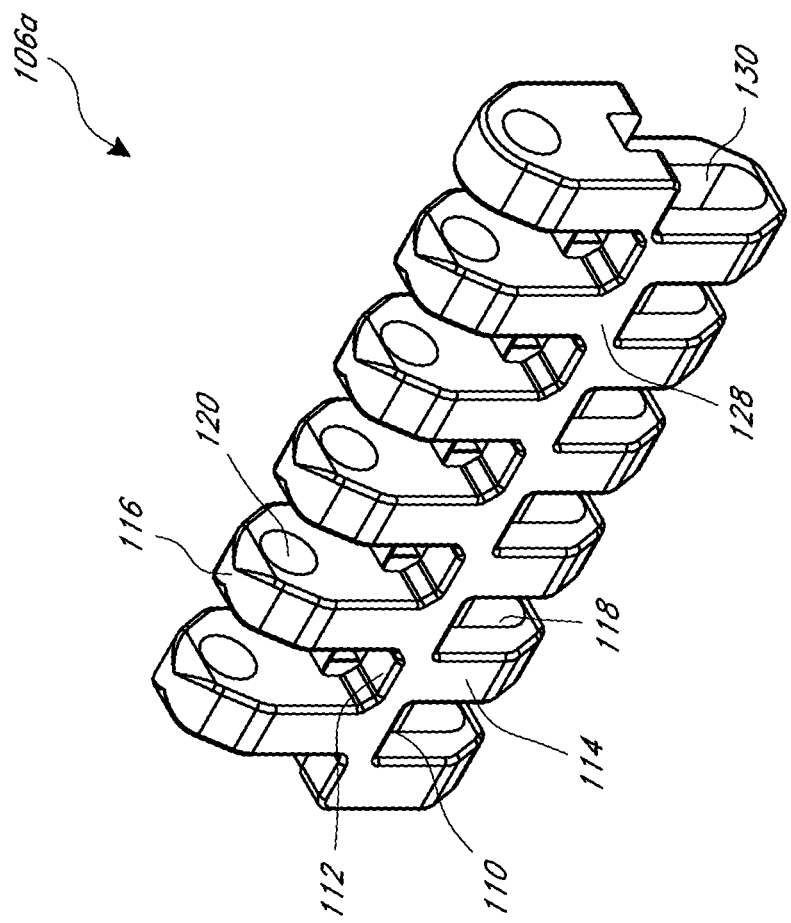
FIG. 17A illustrates a perspective view of another module of the module row shown in FIG. 14.
Figure 17B:
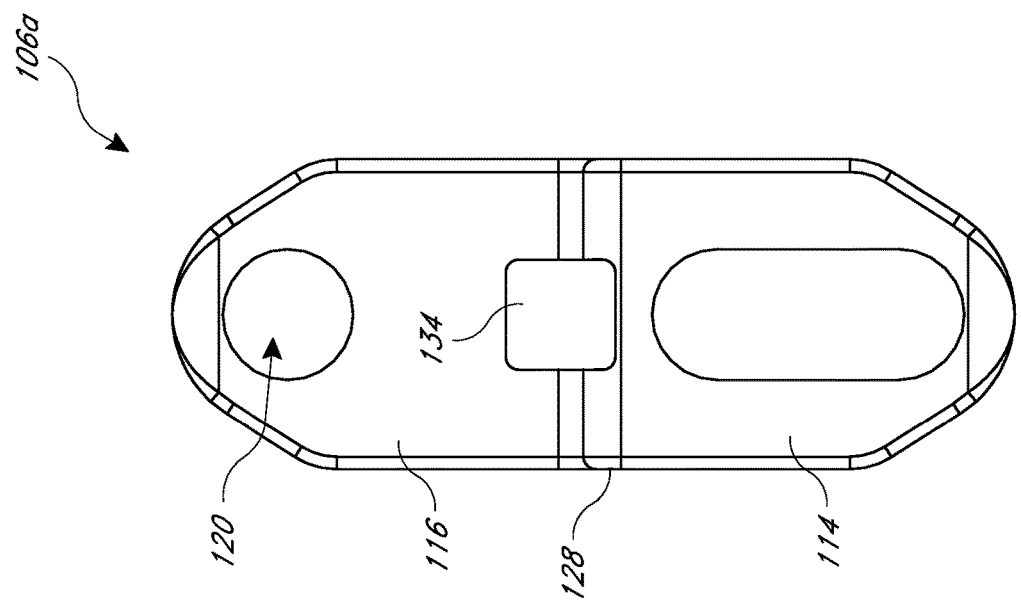
FIG. 17B illustrates an end of the module shown in FIG. 17A.
Figure 17C:
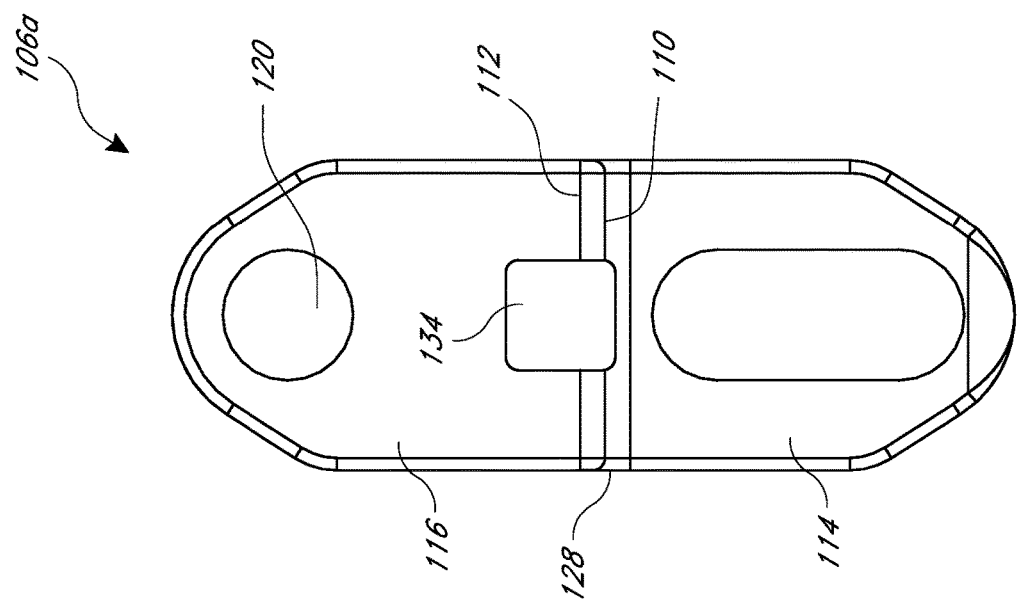
FIG. 17C illustrates another end of the module shown in FIG. 17A.

As shown in FIG. 16D, the central portion 128 can be asymmetrical along a generally vertical axis of the module 106b when positioned on a track (along an axis 129 extending generally from the left side to the right side in FIG. 16D). The central portion 128 can have a first portion 128a and a second portion 128b. In some embodiments, as illustrated, the first portion 128a is positioned at or near a top surface of the module 106b and the second portion 128b is position at or near a bottom surface of the module 106b. On a first side, an edge of one of these portions can extend further in one direction that is generally in the longitudinal plane of the module 106b (e.g., the plane of the direction of travel of the module 106b) than an edge of the other portion. Conversely, on an opposing second side of the module 106b, the portion that has the recessed edge on the first side can comprise an edge on the second side that can extend further in a generally opposite direction in the longitudinal plane of the module 106b than an edge of the other portion.

For example, as illustrated, a front edge of the first portion 128a can extend further in the forward direction beyond a front edge of the second portion 128b; and a rear edge of the second portion 128b can extend further in the rearward direction beyond a rear edge of the first portion 128a. In some embodiments, the first portion 128a can extend further in the rearward direction than the second portion 128b and/or the second portion 128b can extend further in the forward direction than the first portion 128a. In some embodiments, a single segment of the central portion 128 can extend beyond another segment of the central portion on one side, but the opposing side can comprise an edge extending generally vertically across the module 106b with a generally even edge that extends generally from top to bottom of the module 106b. As illustrated, the asymmetrical central portion 128 can permit adjacent module rows to move closer together to improve the turning radius, while still maintaining the strength of the conveyor.

For example, by providing the front edge of the second portion 128b in a recessed position behind the front edge of the first portion 128a, the abutting rear edge of a link of an adjacent module in front of module 106b can move in more closely to the generally vertical midline 129 of the module 106b, especially during turning or side flexing. Also, at least one and/or at least two generally thicker portions at or near the top surface 131 and/or at or near the bottom surface 133 of the module 106b can provide stability and structural strength. In some embodiments, as illustrated, the thickness of the top surface 131 (e.g., the distance from the front edge to the rear edge) is larger than, such as at least about twice as large as, the thickness of the intermediate section 135. In some embodiments, the thickness of the bottom surface 133 can be larger than, such as at least about twice as large as, the thickness of the intermediate portion 135. As shown, the thickness of the top surface 131 can be about the same as the thickness of the bottom surface 133.

An asymmetrical design, as in the illustrated example, can also simplify and diminish the cost of manufacturing by permitting the module 106b to be injection molded in a process that comprises a generally vertical top mold portion that generally approaches from the left (top) side in FIG. 16D and a generally vertical bottom portion that generally approaches from the right (bottom) side of FIG. 16D, with each mold portion being tapered in only one direction (either increasing or decreasing in width from front to back, which is illustrated as top to bottom in FIG. 16D) as it progresses along a generally vertical axis. This single direction of tapering can eliminating the requirement for one or more additional mold pieces that may otherwise need to be inserted from the front or rear of the module 106b (from the top or bottom in FIG. 16D), as may be necessary if the intermediate portion 135 were to taper inward and then outward on the side along a vertical axis. The more complex molding process with more than two main mold pieces may be used in manufacturing some embodiments of module 6c, as illustrated in FIG. 9c, for example.

In some embodiments, the central portion 128 can be generally symmetrical. The central portion 128 can include a chamfer edge (not shown) along the front side 112 and/or the rear side 110 of the central portion 128. The chamfer edge allows the module 106b to move closer to the adjacent module row 104 when the conveyor 102 moves along the curved track section, which decreases the radius ratio of the conveyor. The chamfer edge also helps minimize the total amount of material and diminish the cost of the product.

FIGS. 17A-C and 18A-C illustrate different views of end modules 106a and 106c. The end modules 106a,c can include any of the features described above in reference to module 106b or any of modules 6a-c. The end modules 106a,c can include the same number or a different number of links as module 106b.

Although the side-flexing conveyor has been disclosed in the context of certain embodiments and examples, it will be understood by those skilled in the art that the side-flexing conveyors extend beyond the specifically disclosed embodiments to other alternative embodiments and/or uses of the embodiments and certain modifications and equivalents thereof. For example, some embodiments can be configured to be used with other types of conveyor systems or configurations. It should be understood that various features and aspects of the disclosed embodiments can be combined with or substituted for one another. Accordingly, it is intended that the scope of the disclosure herein disclosed should not be limited by the particular disclosed embodiments described above, but should be determined only by a fair reading of the claims that follow.

The following is claimed:

1. A conveyor adapted to travel through straight and curved paths, the conveyor comprising:
   a plurality of modules, each of the modules having a width, height, and thickness, the width extending between a first lateral side of the module and a second lateral side of the module, the height extending between a substantially planar top surface of the module and a substantially planar bottom surface of the module, the bottom surface being continuous from substantially the first lateral side to substantially the second lateral side, the thickness extending generally parallel to the direction of travel of the conveyor between a leading portion of the module and a trailing portion of the module,
   each of the modules comprising:
      a central portion extending from the first lateral side of the module to the second lateral side of the module, the central portion having a thickness extending from a front edge to a rear edge;
      wherein the central portion comprises a main region that extends from the first lateral side to the second lateral side along a continuous straight path;
      a plurality of front links extending generally perpendicular to the main region, each of the plurality of front links having a first end connected with the front edge of the main region and a second end opposite the first end, the second end terminating in a front tip, wherein the second end of the front links have a width that is less than or equal to a width of the first end;
      wherein each of the front links has a front link length, the front link length being measured from the front edge of the main region to the corresponding front tip, the front link length of each of the front links being generally equal;
      a plurality of front gaps, each of the plurality of front gaps bounded by a portion of the front edge of the main region and by lateral sides of adjacent front links;
      a plurality of first front apertures, each of the plurality of front links including one of the first front apertures;
      a plurality of rear links extending generally perpendicular to the main region, each of the plurality of rear links having a first end connected with the rear edge of the main region and a second end opposite the first end, the second end terminating in a rear tip;
      wherein each of the rear links has a rear link length, the rear link length being measured from the rear edge of the main region to the corresponding rear tip, the rear link length of each of the rear links being generally equal;
      wherein the bottom surface of the module comprises at least a portion of at least one of the rear links;
      a plurality of rear gaps, each of the plurality of rear gaps bounded by a portion of the rear edge of the main region and by lateral sides of adjacent rear links;
      a plurality of a rear apertures, each of the plurality of rear links including one of the rear apertures, the rear apertures being elongate in cross-sectional shape;
      wherein each of the front gaps is configured to receive one of the rear links of a frontwardly-adjacent module, and each of the rear gaps is configured to receive one of the front links of a rearwardly-adjacent module; and
   a plurality of rods, wherein each rod extends:
      continuously from substantially a first lateral side of the conveyor to substantially a second lateral side of the conveyor; and
      through the front apertures of a first module and through the rear apertures of a second module, thereby pivotally connecting the first and second modules;
   whereby the first and second modules are each configured to move relative to each other within a plane of travel of the conveyor, thereby facilitating flexing of the conveyor through curved paths.

2. The conveyor of claim 1, wherein the plurality of modules are arranged in a brick-lay pattern.

3. The conveyor of claim 1, wherein the thickness of the main region is generally constant at the top surface of the module.

4. The conveyor of claim 1, wherein each of the first front apertures further comprise a first portion and a second portion, wherein the first and second portions intersect.

5. The conveyor of claim 4, wherein each of the second portions is sized so as to inhibit the rod from entering the second portions.

6. The conveyor of claim 5, wherein, in each front link, the first and second portions together form a key-hole shape.

7. The conveyor of claim 1, further comprising a plurality of second front apertures, each of the plurality of front links including at least a portion of one of the second front apertures, the second front apertures configured to reduce the weight of the module.

8. The conveyor of claim 7, wherein the second front aperture is spaced apart from the first front aperture.

9. The conveyor of claim 8, wherein a portion of the second front aperture is positioned in the main region.

10. The conveyor of claim 1, wherein at least a majority of a top surface of the main region is generally planar.

11. The conveyor of claim 1, wherein the first front aperture is a round hole.

12. The conveyor of claim 1, wherein at least one of the modules includes a rod securing link with an opening configured to receive an end of one of the rods.

13. The conveyor of claim 1, wherein an end portion of at least one front links is tapered toward the front tip.

14. The conveyor of claim 1, wherein a majority of the front links include a uniform shape.

15. The conveyor of claim 1, wherein an end portion of at least one rear link is tapered.

16. The conveyor of claim 1, wherein a majority of the rear links include a uniform shape.

17. The conveyor of claim 1, wherein each of the modules does not include a connector extending below the bottom surface.

18. The conveyor of claim 1, wherein at least one of the front links comprises a width that is substantially constant from the first end to the second end.

19. The conveyor of claim 1, wherein the second end of the rear links have a width that is less than or equal to a width of the first end.

20. The conveyor of claim 1, wherein one of the front edge and the rear edge comprises a substantially planar surface that extends between the top surface and the bottom surface, the other of the front edge and the rear edge comprising a concave recess that extends between the top surface and the bottom surface.

21. A conveyor belt that is adapted to travel along straight and curved paths, the conveyor belt comprising:
a plurality of rows of belt modules extending from a first lateral side of the conveyor belt to a second lateral side of the conveyor belt; and
a plurality of rods, each of the rods comprising a flange and pivotally interlocking adjacent rows of the belt modules;
wherein each row of belt modules comprises a first module, a second module laterally adjacent a first side of the first module, and a third module laterally adjacent a second side of the first module, each of the first, second, and third modules comprising:
a central portion comprising a main region extending between a substantially planar top surface and a bottom surface, the bottom surface being substantially planar and being continuous from substantially a first lateral side of the module to substantially a second lateral side of the module, the main region extending in a straight path from the first lateral side of the module to the second lateral side of the module, the main region having a thickness extending generally in the direction of belt travel between a front edge and a rear edge, one of the front edge and the rear edge comprising a substantially planar surface that extends between the top surface and the bottom surface, the other of the front edge and the rear edge comprising a concave recess that extends between the top surface and the bottom surface;
a plurality of front links connected with the front edge of the main region and extending generally perpendicular to the main region, each of the plurality of front links having a front tip;
a plurality of front apertures configured to receive one of the rods, each of the plurality of front links including one of the front apertures, the front apertures having an elongate cross-sectional shape;
a plurality of rear links connected with the rear edge of the main region and extending generally perpendicular to the main region, each of the plurality of rear links having a rear tip; and
a plurality of a rear apertures configured to receive one of the rods, each of the plurality of rear links including one of the rear apertures;
wherein the third module further comprises a rod-securing front link located at the first lateral side of the conveyor belt and extending generally parallel to the plurality of front links, the rod-securing front link comprising an opening configured to receive one of the rods, the opening having a circular cross-sectional shape, the rod-securing front link being configured to facilitate fixing the rod with respect to the third module, thereby inhibiting the rod from moving laterally relative to the row of belt modules.

22. The conveyor belt of claim 21, wherein the thickness of the main region is generally constant at at least one of the top and bottom surfaces.

23. The conveyor belt of claim 21, wherein the front links of each of the first, second, and third modules further comprise a second front aperture.

24. The conveyor belt of claim 21, wherein the front apertures have a key-hole shape.

25. The conveyor belt of claim 21, wherein each of the rods comprises a single rod that extends continuously from substantially the first lateral side of the conveyor belt to substantially the second lateral side of the conveyor belt.

26. The conveyor belt of claim 21, wherein the rear links comprise a first end connected with the front edge of the main region and a second end opposite the first end, the second end terminating at the front tip, wherein the second end of the front links have a width that is less than or equal to a width of the first end.

27. The conveyor belt of claim 21, wherein the rear links comprise a first end connected with the rear edge of the main region and a second end opposite the first end, the second end terminating at the rear tip, wherein the second end of the front links have a width that is less than or equal to a width of the first end.

28. The conveyor belt of claim 21, wherein the substantially planar surface that extends between the top and bottom surfaces is substantially perpendicular to the direction of travel.

29. The conveyor belt of claim 21, wherein the substantially planar surface that extends between the top and bottom surfaces is positioned between laterally adjacent front links.

30. A conveyor adapted to travel through straight and curved paths, the conveyor comprising:
a plurality of modules, each of the modules having a width, height, and thickness, the width extending between a first lateral side of the module and a second lateral side of the module, the height extending between a substantially planar top surface of the module and a bottom surface of the module, the thickness extending generally parallel to the direction of travel of the conveyor between a leading portion of the module and a trailing portion of the module, each of the modules comprising:
- a central portion extending from the first lateral side of the module to the second lateral side of the module, the central portion having a thickness extending from a front edge to a rear edge;
- wherein the central portion comprises a main region that extends from the first lateral side to the second lateral side along a continuous straight path;
- a plurality of front links extending generally perpendicular to the main region, each of the plurality of front links having a first end connected with the front edge of the main region and a second end opposite the first end, the second end terminating in a front tip;
- wherein each of the front links has a front link length, the front link length being measured from the front edge of the main region to the corresponding front tip, the front link length of each of the front links being generally equal;
- a plurality of front gaps, each of the plurality of front gaps bounded by a portion of the front edge of the main region and by lateral sides of adjacent front links;
- a plurality of first front apertures, each of the plurality of front links including one of the first front apertures;
- a plurality of rear links extending generally perpendicular to the main region, each of the plurality of rear links having a first end connected with the rear edge of the main region and a second end opposite the first end, the second end terminating in a rear tip, wherein the second end of the rear links have a width that is less than or equal to a width of the first end;
- wherein each of the rear links has a rear link length, the rear link length being measured from the rear edge of the main region to the corresponding rear tip, the rear link length of each of the rear links being generally equal;
- a plurality of rear gaps, each of the plurality of rear gaps bounded by a portion of the rear edge of the main region and by lateral sides of adjacent rear links;
- a plurality of a rear apertures, each of the plurality of rear links including one of the rear apertures, the rear apertures being elongate in cross-sectional shape;
- wherein each of the front gaps is configured to receive one of the rear links of a frontwardly-adjacent module, and each of the rear gaps is configured to receive one of the front links of a rearwardly-adjacent module; and
- wherein a portion of at least one of the front or rear links forms a portion of the bottom surface of the module, and wherein the module does not include a connector that protrudes below the bottom surface; and
- a plurality of rods, wherein each rod extends:
  - continuously from substantially a first lateral side of the conveyor to substantially a second lateral side of the conveyor; and
  - through the front apertures of a first module and through the rear apertures of a second module, thereby pivotally connecting the first and second modules;
- whereby the first and second modules are each configured to move relative to each other within a plane of travel of the conveyor, thereby facilitating flexing of the conveyor through curved paths.

31. The conveyor of claim 30, wherein the second end of the front links have a width that is less than or equal to a width of the first end.

* * * * *